(12) United States Patent
Baker et al.

(10) Patent No.: US 11,204,678 B1
(45) Date of Patent: Dec. 21, 2021

(54) USER INTERFACES FOR OBJECT EXPLORATION IN VIRTUAL REALITY ENVIRONMENTS

(71) Applicant: Amazon Technologies, Inc., Seattle, WA (US)

(72) Inventors: Dillon Taylor Baker, Seattle, WA (US); Jesse Alan DuPree, Fall City, WA (US); Joonhao Chuah, Seattle, WA (US); Lee David Thompson, Normandy Park, WA (US); Kristian Kane, Seattle, WA (US); Hai Quang Kim, Bellevue, WA (US); Brian James Mount, Seattle, WA (US); Michael Thomas, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 71 days.

(21) Appl. No.: 16/711,221

(22) Filed: Dec. 11, 2019

(51) Int. Cl.
*G06F 3/048* (2013.01)
*G06F 3/0481* (2013.01)
*G06F 3/0482* (2013.01)
*G06F 3/0485* (2013.01)
*G06T 19/00* (2011.01)

(52) U.S. Cl.
CPC ........ *G06F 3/04815* (2013.01); *G06F 3/0482* (2013.01); *G06F 3/0485* (2013.01); *G06T 19/006* (2013.01)

(58) Field of Classification Search
CPC .. G06F 3/04815; G06F 3/0482; G06F 3/0485; G06T 19/006
See application file for complete search history.

(56) References Cited

U.S. PATENT DOCUMENTS

| | | | |
|---|---|---|---|
| 2005/0091578 A1* | 4/2005 | Madan | G06F 40/169 715/201 |
| 2009/0037840 A1* | 2/2009 | Chen | G16H 30/40 715/784 |
| 2010/0110099 A1* | 5/2010 | Averett | G06F 16/3328 345/592 |
| 2011/0154243 A1* | 6/2011 | Styga | G06T 19/00 715/771 |
| 2012/0297309 A1* | 11/2012 | Robb | G06Q 30/00 715/738 |
| 2018/0098059 A1* | 4/2018 | Valdivia | H04N 13/398 |
| 2020/0210138 A1* | 7/2020 | MacConnell | G06F 3/0482 |
| 2020/0341609 A1* | 10/2020 | Yamada | G06F 3/0485 |

* cited by examiner

*Primary Examiner* — Claudia Dragoescu
(74) *Attorney, Agent, or Firm* — Athorus, PLLC

(57) ABSTRACT

Systems and methods related to user interfaces for object exploration and manipulation within virtual reality environments may include a plurality of user interfaces that are presented responsive to various user inputs or interactions. For example, a first user interface may comprise a hover card that is presented responsive to a hover indication over an object, a second user interface may comprise a detail card that is presented responsive to a selection input associated with an object, and a third user interface may comprise a detail page having a plurality of detail panels that are presented responsive to a selection of a full details option associated with an object. Further, individual detail cards and detail panels may be graspable, movable, scrollable, and otherwise manipulatable by a user to facilitate object exploration.

20 Claims, 14 Drawing Sheets

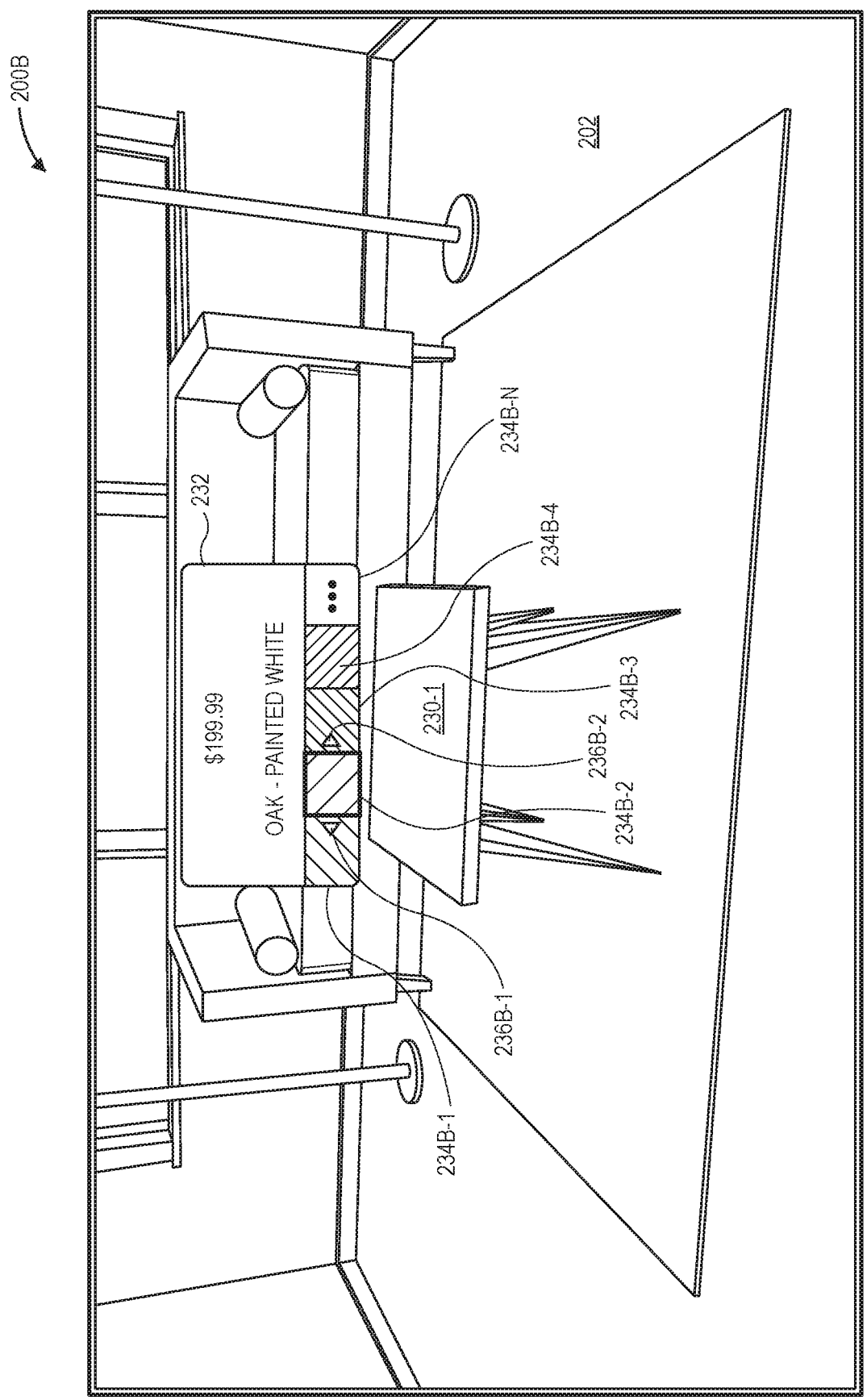

USER INTERFACES FOR OBJECT EXPLORATION IN VIRTUAL REALITY ENVIRONMENTS

BACKGROUND

Virtual reality devices such as headsets with corresponding controllers are increasing in use. Generally, virtual reality devices may allow users to be completely immersed in digital environments, such as video games or other virtual reality environments. However, conventional, text-based menus, associated menu structures, and text-based user interfaces may be difficult, cumbersome, and unnatural to use in such immersive digital environments, and may also reduce the desired immersive effect when using virtual reality devices. Accordingly, there is a need for virtual reality user interfaces that facilitate simple and intuitive interactions by users with objects or other aspects of the digital environments.

BRIEF DESCRIPTION OF THE DRAWINGS

FIG. 2B is a schematic diagram of another example user interface including a hover card for object exploration within a virtual reality environment, in accordance with implementations of the present disclosure.

DETAILED DESCRIPTION

Figure 1:
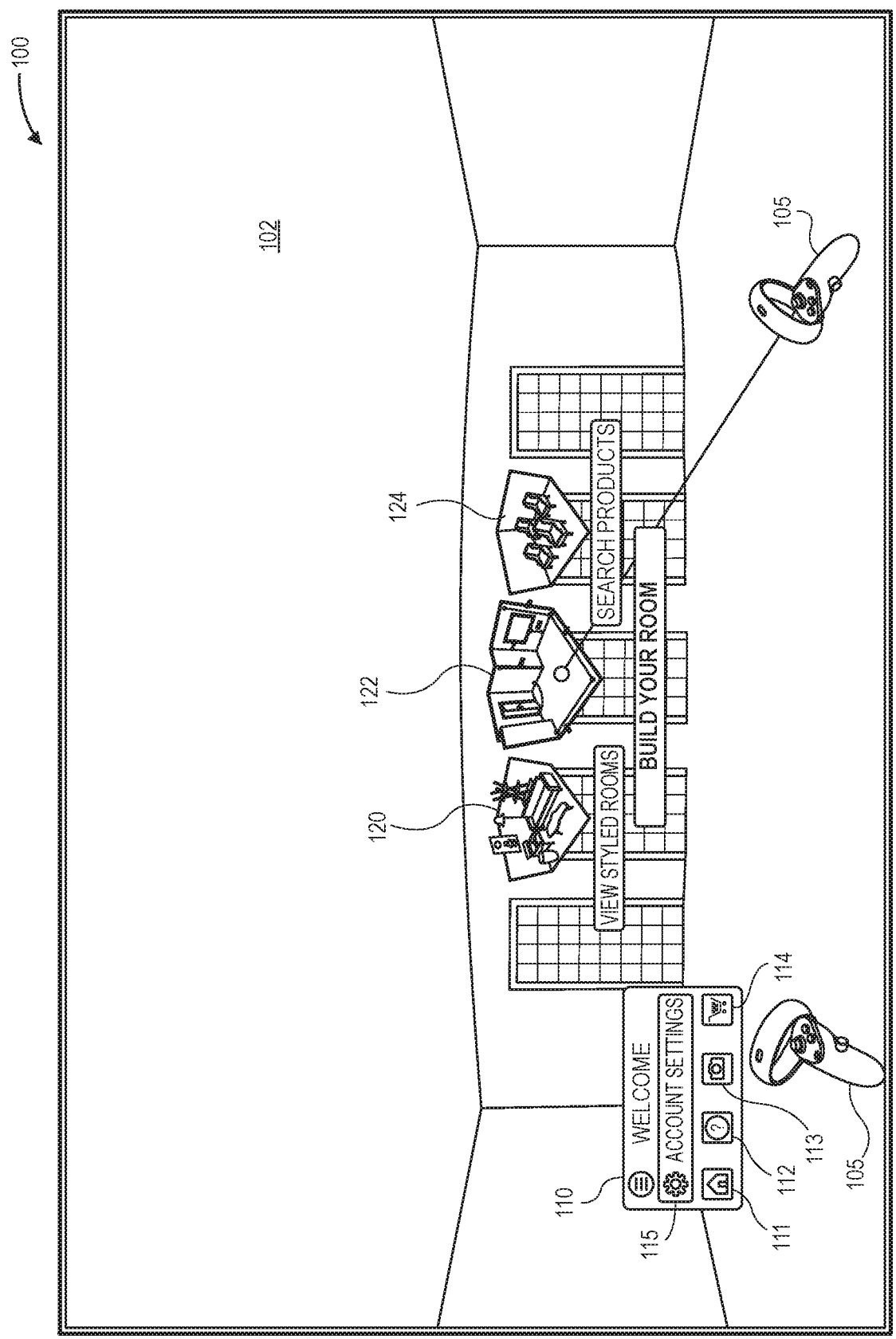
FIG. 1 is a schematic diagram of an example virtual reality environment, in accordance with implementations of the present disclosure.

As is set forth in greater detail below, implementations of the present disclosure are directed to systems and methods related to various types of user interfaces that present varying levels or amounts of information within virtual reality, augmented reality, mixed reality, and/or extended reality environments to facilitate object exploration. Using the user interfaces described herein, users may be able to search, browse, view, select, place, move, remove, modify, save, evaluate, compare, purchase, or otherwise manipulate various objects and/or portions of a virtual reality environment in a simple, intuitive, and immersive manner.

In example embodiments, the example user interfaces for virtual reality environments described herein may include hover cards that present at least one additional detail associated with an object responsive to a hover indication over the object. The object may comprise a two-dimensional image or a three-dimensional model of an object that may be presented within a virtual reality environment, e.g., within a room or space of the virtual reality environment. In addition, the object may comprise furniture, tables, chairs, lamps, rugs, sofas, artwork, mirrors, appliances, other furnishings, doors, windows, trim, paint, flooring, surface coverings or treatments, other fixtures, user account settings, preferences, histories, recommendations, help topics, saved images or screenshots, and/or other aspects of virtual reality environments.

The at least one additional detail presented within the hover card may include one or more aspects or characteristics associated with the object, such as price, user rating, name, brand, materials, or other information. In addition, the hover card may be presented in a defined position and orientation relative to the object, such as above or to a side of the object. Further, the at least one additional detail may also include one or more selectable variations or options associated with the object, such as color, materials, texture, finish, or other variations.

In additional example embodiments, the example user interfaces for virtual reality environments described herein may include detail cards that present at least some additional details associated with an object responsive to a selection input with respect to the object. The object may comprise a two-dimensional image or a three-dimensional model of an object that may be presented within a virtual reality environment, e.g., within a room or space of the virtual reality environment. In addition, the object may comprise furniture, tables, chairs, lamps, rugs, sofas, artwork, mirrors, appliances, other furnishings, doors, windows, trim, paint, flooring, surface coverings or treatments, other fixtures, user account settings, preferences, histories, recommendations, help topics, saved images or screenshots, and/or other aspects of virtual reality environments.

The at least some additional details presented within the detail card may include one or more aspects or characteristics associated with the object, such as badges, name, brand, price, user rating, materials, shipping information, availability information, or other information. In addition, the detail card may be presented in a position and orientation relative to the object based on a plurality of factors, such as a field of view of the user, aspects or characteristics of the object, other objects presented proximate the object within the virtual reality environment, portions of the environment presented proximate the object within the virtual reality environment, or other factors. Further, one or more selectable options may also be presented with the detail card that presents at least some additional details associated with the object, such as a replace option, a duplicate option, a remove option, a full details option, an add to list option, an add to shopping cart option, or other selectable options. Moreover, the detail card may be graspable, movable, scrollable, and/or otherwise manipulatable by a user, e.g., using a controller or other input device.

In further example embodiments, the example user interfaces for virtual reality environments described herein may include detail pages including a plurality of detail panels that present full details associated with an object responsive to a selection input with respect to viewing full details of the object. The object may comprise a two-dimensional image or a three-dimensional model of an object that may be presented within a virtual reality environment, e.g., within a room or space of the virtual reality environment. In addition, the object may comprise furniture, tables, chairs, lamps, rugs, sofas, artwork, mirrors, appliances, other furnishings, doors, windows, trim, paint, flooring, surface coverings or treatments, other fixtures, user account settings, preferences, histories, recommendations, help topics, saved images or screenshots, and/or other aspects of virtual reality environments.

The plurality of detail panels presented within the detail page may include a plurality of columns of detail panels that may be arranged in an arc or curve around a user position within the virtual reality environment, and various portions or columns of the detail page may be presented within various zones associated with a field of view of the user. Each of the plurality of columns may present various information associated with the object, such as videos, object variations, object aspects or characteristics, images, user reviews, information from a manufacturer or supplier, similar or recommended objects, or other information, and each column may be movable or scrollable by a user, e.g., using a controller or other input device. In addition, one or more selectable options may also be presented with the detail page that presents the full details associated with the object, such as an add to list option, an add to shopping cart option, a back option, a close option, or other selectable options. Moreover, one or more of the plurality of detail panels of the detail page may be graspable, movable, scrollable, and/or otherwise manipulatable by a user, e.g., using a controller or other input device.

In additional example embodiments, the one or more objects that may be presented within a virtual reality environment may comprise various other types of products or items, including but not limited to apparel, books, electronics, luggage, jewelry, consumer goods, food, beverages, vehicles, equipment, or various other types of products or items. Further, the one or more objects may also be defined with various aspects or attributes. For example, the aspects or attributes may include a type, category, size, shape, dimensions, mass, weight, volume, color, texture, pattern, material, price, rating, availability, purchase options, other menu options, or other attributes of an object. In addition, the aspects or attributes may include a bounding box or volume that substantially surrounds an outer periphery of an object. The bounding box or volume may include a rectangular prism, a cylindrical prism, a sphere, other polygonal volume, or other irregularly shaped volume.

Using the example user interfaces described herein, users may explore different levels or amounts of information associated with various objects within virtual reality environments, and users may view, manipulate, and interact with various objects and/or portions of presented information responsive to various user interactions or inputs within virtual reality environments.

As one skilled in the art will appreciate in light of this disclosure, certain embodiments may be capable of achieving certain advantages, including some or all of the following: intuitively and efficiently presenting varying levels or amounts of information associated with objects based on user interactions or inputs to improve and simplify user experiences such as object exploration within virtual reality environments, intuitively and efficiently presenting a first level of minimal information associated with objects via hover cards to improve and simplify user experiences such as object exploration within virtual reality environments, intuitively and efficiently presenting a second level of additional information associated with objects via detail cards to improve and simplify user experiences such as object exploration within virtual reality environments, intuitively and efficiently presenting a third level of full information associated with objects via detail pages having a plurality of detail panels to improve and simplify user experiences such as object exploration within virtual reality environments, maintaining and improving immersive virtual reality experiences using visual and intuitive combinations of different user interfaces presenting varying levels or amounts of information, improving and simplifying virtual reality user interfaces and user experiences by providing intuitive grasping, movement, scrolling, and manipulation of detail cards associated with objects within virtual reality environments, improving and simplifying virtual reality user interfaces and user experiences by providing intuitive grasping, movement, scrolling, and manipulation of detail panels of detail pages associated with objects within virtual reality environments, improving and simplifying virtual reality experiences by enabling simple and intuitive searching, browsing, viewing, selection, placement, movement, removal, modification, saving, evaluation, comparison, sharing, purchasing, and other manipulations associated with objects within virtual reality environments, etc.

The task of navigating a large electronic catalog of objects or items (e.g., a catalog with millions or billions of items) to locate objects or items of interest can be burdensome and time consuming for users, especially if the users do not know the names or generic descriptors of the desired items. Typically, the user can locate items by navigating a text-based, browse structure, commonly called a "browse tree," in which the items are arranged by category and subcategory. Typically, however, the browse tree includes several levels of categories, requiring the user to navigate through several levels of browse nodes or category pages to arrive at the subcategory of interest. Further, in many cases, the objects or items of interest are not accurately or intuitively categorized, requiring the user to perform additional navigation or keyword searching. Thus, the user frequently has to perform numerous navigational steps to arrive at the catalog page or "item detail page" of interest. When the user arrives at the catalog page or "item detail page" of interest, the user may then need to perform additional navigational steps or perform additional searches to identify whether the desired item includes the desired features. For example, the user may need to click on and navigate to various product images to see what the product looks like from various angles. By way of another example, the user may need to scroll through numerous community provided content to see if the item is appropriate for a given environment (e.g., scrolling through hundreds of images from other users to see how the item looks in their environment—such as a how a chair looks in combination with other furniture and carpets). By way of still another example, the user may need to sift through hundreds or thousands of customer reviews and questions/answers to determine if the item includes desired features and compatibility characteristics.

Another technological advance of the present disclosure is that the generation and use of combinations of visual, intuitive user interfaces that present varying levels or amounts of information based on user interactions or inputs allows users to identify objects or items of interest with fewer clicks, scrolls, and/or page navigations than would otherwise be required to identify, view, and evaluate items. For example, in the embodiments described herein, when the user is presented with one or more items via the visual and intuitive user interfaces, the user can easily view at least one additional detail of a plurality of presented items via hover indications, view or evaluate at least some additional details of a plurality of presented items via selection inputs, view or evaluate full details of a plurality of presented items via selection inputs with respect to full details selectable options, quickly browse related or similar items to a selected item, and/or grasp, move, scroll, or manipulate portions of presented information to facilitate viewing and evaluation of various items within the virtual reality environments.

Furthermore, with respect to individual presented items, a reference or link may be included or embedded that allows the user to navigate directly to sources of additional information about the item or another item (e.g., other items that include different color, size, or other options for a presented item, other items that are similar, related, popular, or recommended with respect to a presented item). Each reference or link thus serves as a programmatically selected navigational shortcut to an item detail page or description or to other item detail pages and associated details, allowing the user to bypass the navigational structure of the browse tree. Beneficially, programmatically identifying items of interest and presenting the user with navigational shortcuts to these items can improve the speed of the user's navigation through the electronic catalog, rather than requiring the user to page through multiple other pages to locate the recommended items via the browse tree or via searching. This can be particularly true for computing devices with small screens, where fewer items can be displayed to the user at a time and thus navigation of larger volumes of items is more difficult, as well as for virtual reality computing devices with potentially limited textual input methods, where the input of names, categories, keywords, or other search terms may be more difficult and thus identification of items of interest from larger volumes of items is more difficult using conventional, text-based methods.

FIG. 1 is a schematic diagram 100 of an example virtual reality environment, in accordance with implementations of the present disclosure.

As shown in FIG. 1, an example virtual reality environment 102 may be presented as including a plurality of environment surfaces, such as one or more floor surfaces, one or more wall surfaces, one or more ceiling surfaces, and/or one or more other environment surfaces. Further, the various environment surfaces may be presented as including one or more fixtures, such as doors, windows, trim, paint, flooring, surface coverings or treatments, or other fixtures.

In example embodiments, virtual reality environments including various aspects, objects, and/or items may be viewed or experienced by one or more users. For example, a user may view or experience a virtual reality environment using a headset, goggles, or other wearable computing device that visually presents the virtual reality environment via one or more display devices or presentation devices. In addition, a user may receive audio sounds, alerts, notifications, and/or feedback via one or more speakers or audio output devices related to portions of the experience within the virtual reality environment. Further, a user may provide speech, audio input, and/or feedback via one or more microphones or audio input devices related to portions of the experience within the virtual reality environment. The audio input may include audio or voice commands, instructions, or directions to control portions of the experience, and/or the audio input may include speech or conversations between multiple users of the virtual reality environment. Moreover, a user may interact with or manipulate one or more selectable objects or other aspects of the virtual reality environment using one or more controllers, joysticks, or other input/output devices related to portions of the experience within the virtual reality environment. The inputs may include commands, instructions, or directions related to searching, browsing, viewing, selecting, placing, moving, removing, modifying, saving, evaluating, comparing, purchasing, and/or other interactions or inputs related to one or more selectable objects or other aspects of the virtual reality environment. Furthermore, one or more input/output devices, including a headset, goggles, other wearable computing device, controllers, joysticks, or other input/output devices, may provide haptic or tactile outputs and/or feedback related to portions of the experience within the virtual reality environment. The outputs may include alerts, notifications, and/or feedback related to confirmation or completion of one or more actions, errors or alerts related to one or more actions, manipulation or modification of one or more selectable objects, movement or actions of one or more users, or various other feedback related to interactions within the virtual reality environment.

An example virtual reality environment may include a plurality of environment surfaces. For example, the environment surfaces may include one or more floor surfaces, one or more wall surfaces, one or more ceiling surfaces, and/or other environment surfaces. Each environment surface may have various associated aspects or attributes, such as size, shape, position, orientation, dimensions, color, texture, pattern, material, or other attributes. In addition, one or more of the aspects or attributes of an environment surface may be selected, modified, or otherwise manipulated. For example, color, texture, or pattern of an environment surface, such as paint color, wallpaper texture, or other pattern on a wall surface, may be modified. Further, color, texture, pattern, or material of an environment surface, such as vinyl, hardwood, or carpet on a floor surface, may be modified.

In example embodiments, a virtual reality environment, such as an outdoor space, deck, porch, patio, or other partially unbounded space, may include one or more environment surfaces that represent boundaries of the space that are not necessarily wall or ceiling surfaces. Such boundaries may be substantially transparent or translucent, and/or may be visible or highlighted upon user interaction or proximity to the boundaries. In addition, the boundaries may also include various associated aspects or attributes, such as size, shape, position, orientation, dimensions, color, texture, pattern, material, or other attributes. In some example embodiments, the color, texture, or pattern of a boundary may include an image or rendering of surroundings, such as an outdoor space, backyard, neighborhood, street, or other images.

In addition, a virtual reality environment may also include one or more three-dimensional objects or models, which may also be described simply as objects in the discussion herein. For example, the three-dimensional objects may include any of various types of selectable object or items, including furniture, furnishings, fixtures, apparel, books, electronics, luggage, jewelry, consumer goods, food, beverages, vehicles, equipment, or various other types of products or items. Although particular types, numbers, and arrangements of objects are illustrated herein, a virtual reality environment may include any other types, numbers, and arrangements of objects.

Each three-dimensional object or model may have various associated aspects or attributes, such as a type, category, size, shape, dimensions, mass, weight, volume, color, texture, pattern, material, price, rating, availability, purchase options, other menu options, or other attributes of an object. In addition, one or more of the attributes of an object may be selected, modified, or otherwise manipulated. For example, a particular object within a type or category may be selected or modified, such as between different designs or models of chairs, tables, rugs, pictures, clocks, mirrors, etc. In addition, color, texture, pattern, size, or material of an object may be changed or modified, such as between different colors of furniture, different materials of sofas or chairs, different patterns of rugs, different finishes of tables or chairs, different sizes of coffee tables or pictures, etc. Further, a type or category of an object may define the object as a table, chair, end table, coffee table, rug, sofa, lamp, picture, vase, or various other types or categories of objects. Moreover, size, shape, dimensions, mass, weight, or volume of an object may be received from a manufacturer, supplier, distributor, or other provider of the object, or may be determined using one or more machine learning, computer vision, and/or geometrical detection algorithms or approaches. Furthermore, price, rating, availability, purchase options, or other menu options may also be received from a manufacturer, supplier, distributor, or other provider of the object and/or updated over time, and may be viewed or selected by a user.

In addition, the various aspects or attributes of a three-dimensional object or model may include a bounding box or volume that substantially surrounds an outer periphery of an object. The bounding box or volume may include a rectangular prism, a cylindrical prism, a sphere, other polygonal volume, or other irregularly shaped volume. In some example embodiments, a bounding box or volume may be received from a manufacturer, supplier, distributor, or other provider of the object. In other example embodiments, a bounding box or volume may be determined using one or more machine learning, computer vision, and/or geometrical detection algorithms or approaches. For example, the algorithms may comprise various surface, edge, line, or other feature detection algorithms, and/or mesh decimation algorithms, potentially in combination with various computer vision and machine learning algorithms, that may process and analyze one or more images or videos comprising an object in order to detect various surfaces, edges, lines, or other features of an object and determine a bounding box or volume associated with the object.

Various aspects or attributes of environment surfaces and/or three-dimensional objects or models may be modified, manipulated, and/or interacted with by one or more users of virtual reality environments using the user interfaces described herein. As further described herein, a user may browse, view, select, place, move, remove, save, evaluate, compare, and/or modify one or more aspects of a virtual reality environment or one or more environment surfaces thereof, a user may browse, view, select, save, evaluate, compare, and/or modify one or more aspects of an object within a virtual reality environment, and/or a user may browse, view, select, place, move, remove, save, evaluate, compare, purchase, and/or modify one or more objects within the virtual reality environment.

As shown in FIG. 1, one or more controllers, joysticks, or other input/output devices 105 may be at least partially presented within a field of view of a user within a virtual reality environment. For example, a user may utilize only one controller 105, e.g., using a dominant hand, or a user may utilize two controllers 105, e.g., one controller associated with each hand. Each of the controllers 105 may include a laser pointer or other pointing device that extends from the controller 105 in a substantially straight line that may be aligned with and used to point to, hover over, select, grasp, move, place, or otherwise manipulate or interact with one or more objects within a virtual reality environment. In addition, one or both controllers 105 may also include a menu 110 that may be attached or associated with the controller 105, and the menu 110 may include various selectable options, such as a home button 111, a help button 112, a camera or screenshot button 113, a shopping cart or list button 114, and a user account settings button 115. Various other selectable options may also be included in the menu 110, as further described herein.

For example, the home button 111 may return a user to an initial, default, or home screen associated with a virtual reality experience or environment, such as the view presented in FIG. 1, the help button 112 may present various help topics, frequently asked questions, or other information to assist users within a virtual reality environment, the camera button 113 may enable a user to capture one or more images of a virtual reality experience or environment, e.g., for later viewing or to share with other users, the shopping cart button 114 may present a list or view of objects placed within a shopping cart for potential purchase, and the user account settings button 115 may present various information associated with the user or user account, such as profile information, order information, shipping information, payment information, saved lists or groups of objects, user preferences, search histories, recommendations, or other information.

In the example shown in FIG. 1, a user may use a right hand controller substantially as a pointing device, e.g., using a dominant right hand, and a menu 110 may be attached or associated with a left hand controller. Then, using the right hand controller, the user may manipulate or interact with objects within the virtual reality environment using the pointing device, and may also interact with selectable options in the menu 110 using the pointing device. In other examples utilizing only a single controller, the user may use a single controller substantially as a pointing device, e.g., using a dominant hand. Then, using the single controller, the user may manipulate or interact with objects within the virtual reality environment using the pointing device, and may also interact with selectable options in the associated menu 110 using various buttons, trigger buttons, joysticks, or other input elements associated with the single controller.

In example embodiments, the one or more controllers, joysticks, or other input/output devices may include one or more buttons, trigger buttons, joysticks, directional pads, track pads, touch sensitive surfaces, or other input elements. Various individual input elements or combinations of input elements may be actuated or selected to provide corresponding commands, instructions, or directions related to portions of the experience within the virtual reality environment. For example, one or more buttons, trigger buttons, and/or joysticks may allow selection, grasping, movement, placement, release, or other interaction with various objects presented via virtual reality environments or portions thereof. In addition, one or more buttons, trigger buttons, and/or joysticks may allow selection, grasping, movement, placement, release, or other interaction with aspects of virtual reality environments, portions of user interfaces, and/or selectable objects and associated aspects or attributes. Further, one or more joysticks, directional pads, track pads, or touch sensitive surfaces may allow movement or other manipulation of a user position within the environment, e.g., teleporting to various positions within the environment. Various other input elements, or combinations thereof, may allow and/or enable any of the various manipulations or interactions within virtual reality environments further described herein.

As further shown in FIG. 1, an example virtual reality environment may include a plurality of selectable options related to viewing, browsing, searching, selecting, modifying, and/or evaluating one or more objects within the virtual reality environment. For example, the selectable options may include options such as view styled rooms 120, build your room 122, and search products 124. Various other selectable options may also be included in the virtual reality environment, as further described herein.

For example, the view styled rooms 120 option may present various designed or curated rooms or spaces and associated objects for viewing by a user within the virtual reality environment, and various aspects of the styled rooms or spaces may be viewed, selected, modified, saved, evaluated, or interacted with by the user. The build your room 122 option may present various templates from which a user may generate or create a desired room or space, including a floor, walls, ceiling, dimensions, paint, flooring, and other fixtures, as well as design or decorate the room or space as desired with various furniture, other furnishings, or other objects. Further, the search products 124 option may present various user interfaces via which a user may search, browse, view, select, place, move, remove, save, evaluate, compare, purchase, and/or modify one or more objects within the virtual reality environment. Moreover, various user interfaces that present varying levels or amounts of information or details associated with objects, as described herein, may be presented responsive to selection and interaction with any of the various selectable options, including the view styled rooms 120 option, the build your room 122 option, the search products 124 option, and/or other selectable options, e.g., to view or evaluate information or details associated with various fixtures, furniture, furnishings, or other objects presented within virtual reality environments.

Figure 2A:
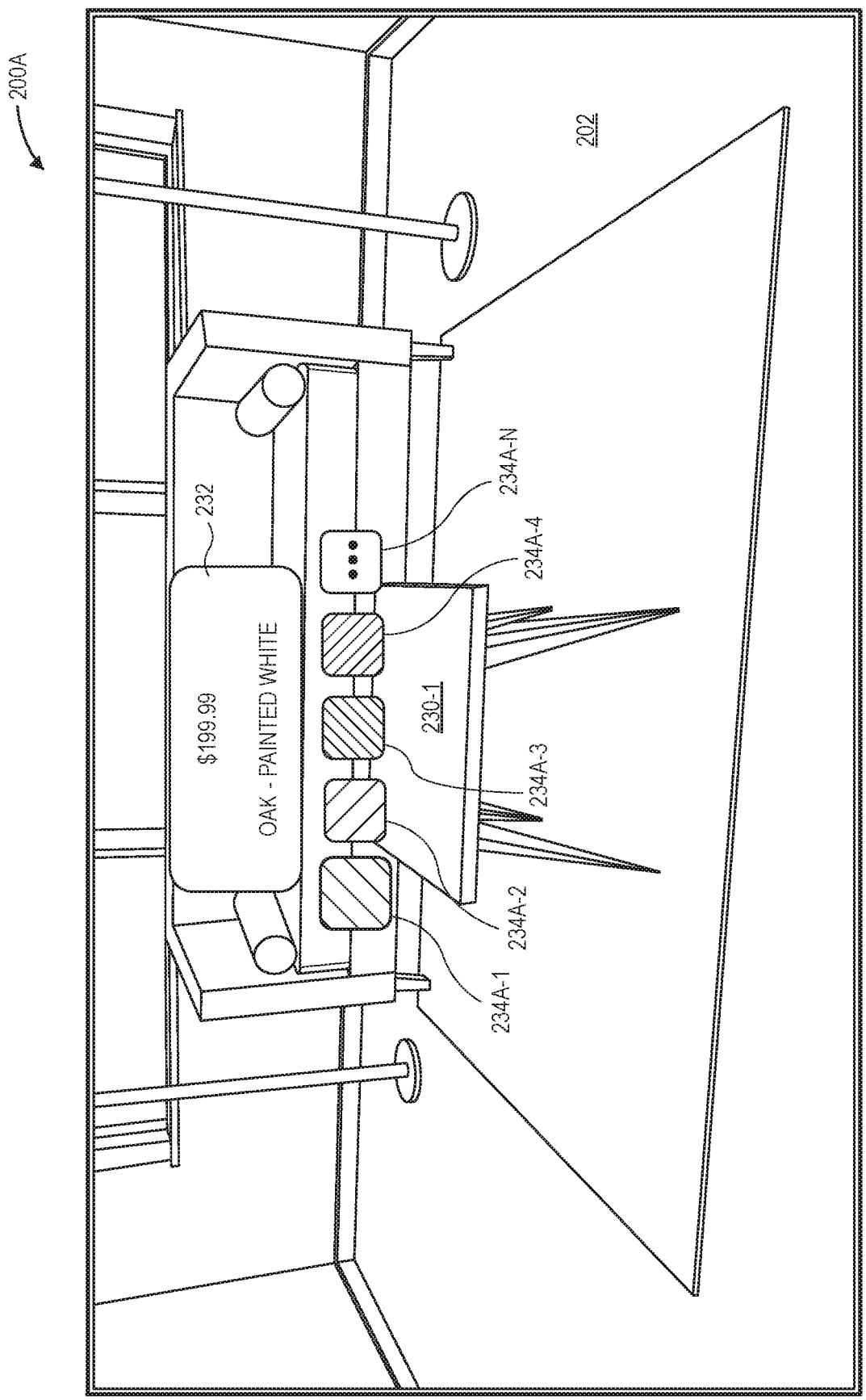
FIG. 2A is a schematic diagram of an example user interface including a hover card for object exploration within a virtual reality environment, in accordance with implementations of the present disclosure.

FIG. 2A is a schematic diagram 200A of an example user interface including a hover card for object exploration within a virtual reality environment, in accordance with implementations of the present disclosure.

As shown in FIG. 2A, responsive to selection of the view styled rooms 120 option in FIG. 1, responsive to selection of the build your room 122 option in FIG. 1 and placement of at least one object within a room or space, and/or responsive to selection of the search products 124 option and placement of at least one object within a room or space, an example virtual reality environment 202 including at least one object, e.g., a three-dimensional object or model, may be presented to a user within a virtual reality environment. The example virtual reality environment 202 may include a plurality of environment surfaces, such as one or more wall, floor, ceiling, or other environment surfaces, that define a room or space, and the environment 202 may also include one or more objects, such as furniture, furnishings, fixtures, or other objects. As shown in FIG. 2A, the room or space may include a plurality of objects, such as a floor, walls, ceiling, windows, rug, lamps, sofa, and table.

Each of the plurality of objects may be presented as a two-dimensional image or a three-dimensional model that is associated with each of the objects. In some example embodiments, to improve user experience, the virtual reality environment may initially be presented with two-dimensional images that may be processed and presented relatively quickly, and upon processing or loading associated three-dimensional models, the three-dimensional models may replace the two-dimensional images within the virtual reality environment to provide a more immersive, three-dimensional experience within the virtual reality environment. Further, the processing or loading of associated three-dimensional models may be ordered or prioritized to load those three-dimensional models that are closest to a user position, before loading those three-dimensional models that are farther from a user position. In other example embodiments, the processing or loading of associated three-dimensional models may be ordered or prioritized to load those three-dimensional models that are within a field of view of a user, before loading those three-dimensional models that are not within a field of view of the user. In further example embodiments, the processing or loading of associated three-dimensional models may be ordered or prioritized to load those three-dimensional models that have larger dimensions, sizes, or shapes, before loading those three-dimensional models that have relatively smaller dimensions, sizes, or shapes. In additional example embodiments, the processing or loading of associated three-dimensional models may be ordered or prioritized to load those three-dimensional models that more closely match recent search queries, filters, or other interactions or inputs received from a user, before loading those three-dimensional models that less closely match recent search queries, filters, or other interactions or inputs received from the user. In other example embodiments, a user may set or select a preference or default setting for either two-dimensional images or three-dimensional models to be presented within the virtual reality environment.

Various user interactions with a plurality of objects within a virtual reality environment may be enabled to facilitate exploration of one or more objects. For example, responsive to receiving a hover indication with respect to an object, e.g., based on directing or aiming a pointing device associated with a controller 105 onto an object, at least one additional detail associated with the object may be presented, such as a price, user rating, brand, material, color, dimensions, object variations or options, or any other aspect or characteristic of the object. In some example embodiments, the additional details that may be presented upon receiving a hover indication may be additional details that are related to one or more filters selected by a user. For example, if a user selected one or more filters related to materials, the additional details that may be presented upon receiving a hover indication may be related to materials included in the object. In addition, a visual presentation of the object may be modified responsive to the hover indication, such as by highlighting, outlining, pulsing, changing size, or other visual indications.

As shown in FIG. 2A, upon receiving a hover indication with respect to the table 230-1 within the environment 202, a hover card 232 and one or more object variations or options 234A may be presented to a user. The hover card 232 may include at least one additional detail associated with the table 230-1, such as price, material, finish, or any other aspect or characteristic of the object. If a user selected one or more filters related to different details associated with the object, the additional details that may be presented may be ordered or prioritized based on a determined order or priority of the selected filters associated with the user, e.g., a first detail associated with a most popular or most recent filter may be displayed at a top of a hover card 232, a second detail associated with a second most popular or second most recent filter may be displayed in a middle of a hover card 232, etc. In addition, the object variations or options 234A may include various different material, color, texture, finish, paint, size, shape, or other object variations or options. For example, the object variations 234A may include a first material and/or finish 234A-1, a second material and/or finish 234A-2, a third material and/or finish 234A-3, a fourth material and/or finish 234A-4, and/or various other materials, finishes, or other options 234A-N, and selecting or toggling through the various object variations 234A may cause corresponding modifications to a presentation of the object 230-1. In addition, the hover card 232 may show details associated with a current object variation in multiple formats, e.g., name of current color, swatch of current color, and/or hovered object presented in current color. Moreover, a hover card 232 may have a configurable limit on the number of characters allotted for text or strings that may be presented within the hover card, and characters may be presented within the hover card at a particular font size, e.g., at a defined distance from the user. Further, a hover card 232 may be configured to occupy a particular size, area, or dimensions within the field of view of a user, e.g., at a defined distance from the user.

Figure 3A:
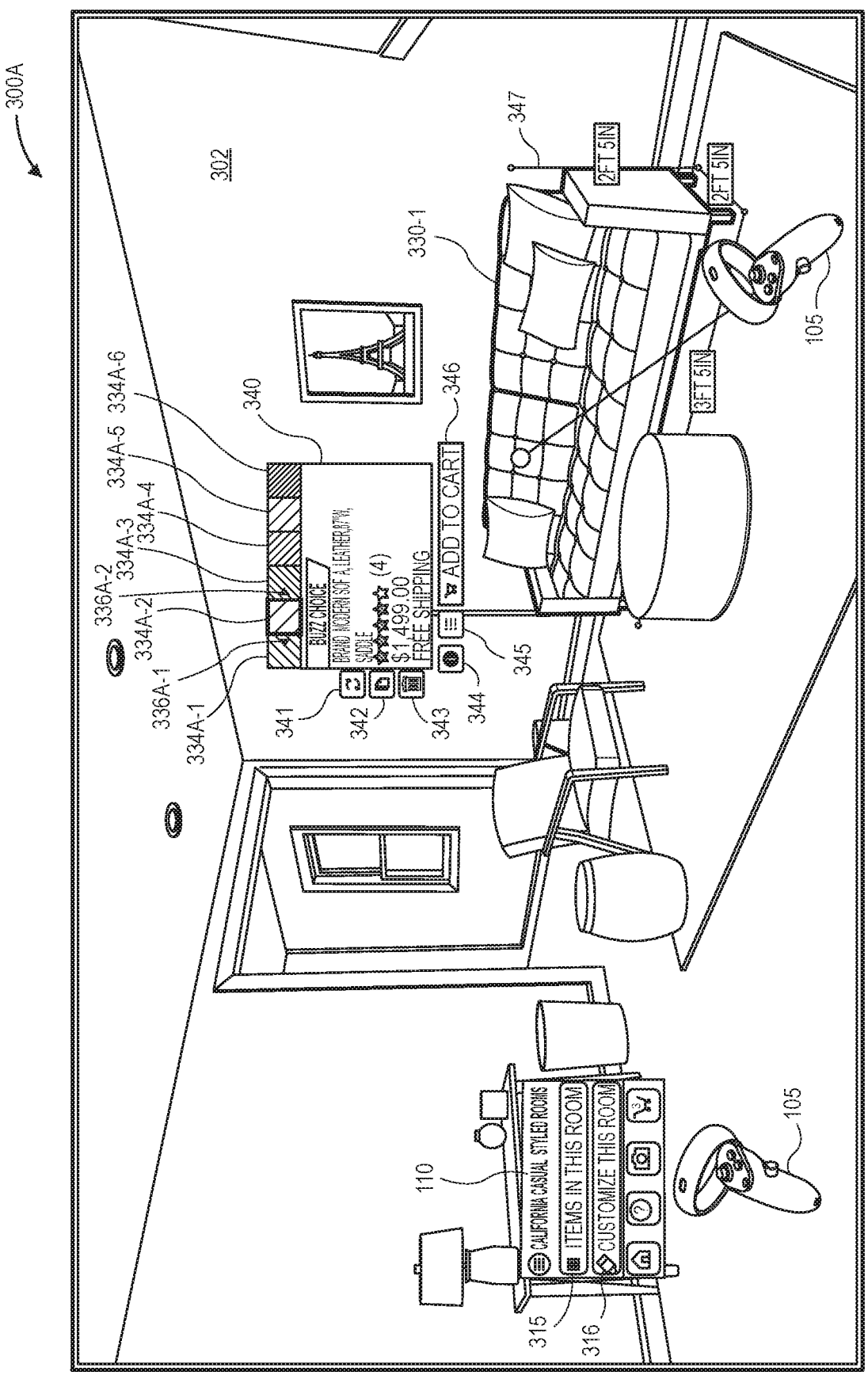
FIG. 3A is a schematic diagram of an example user interface including a detail card for object exploration within a virtual reality environment, in accordance with implementations of the present disclosure.
Figure 3B:
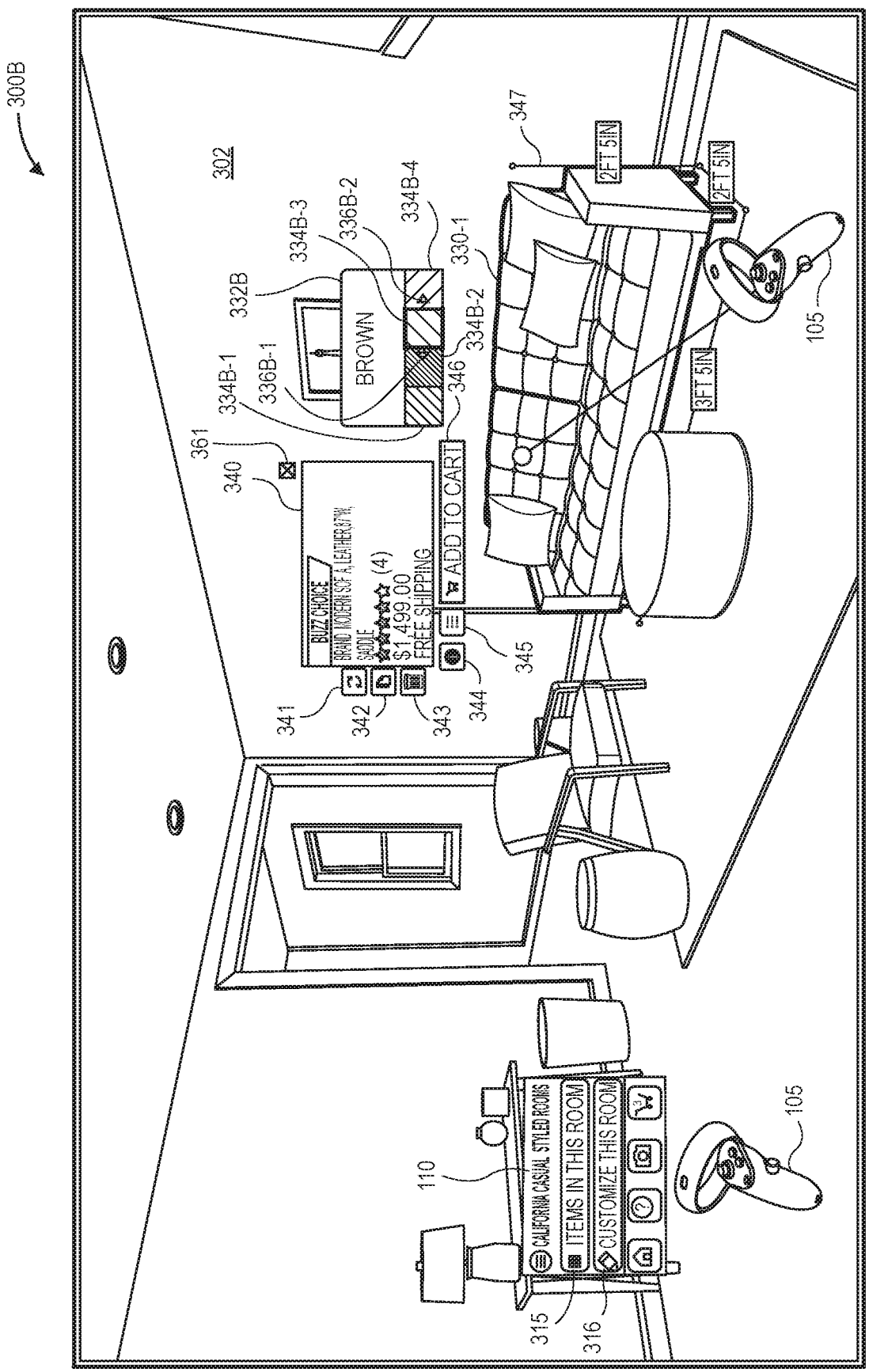
FIG. 3B is a schematic diagram of another example user interface including a detail card and a hover card for object exploration within a virtual reality environment, in accordance with implementations of the present disclosure.
Figure 4:
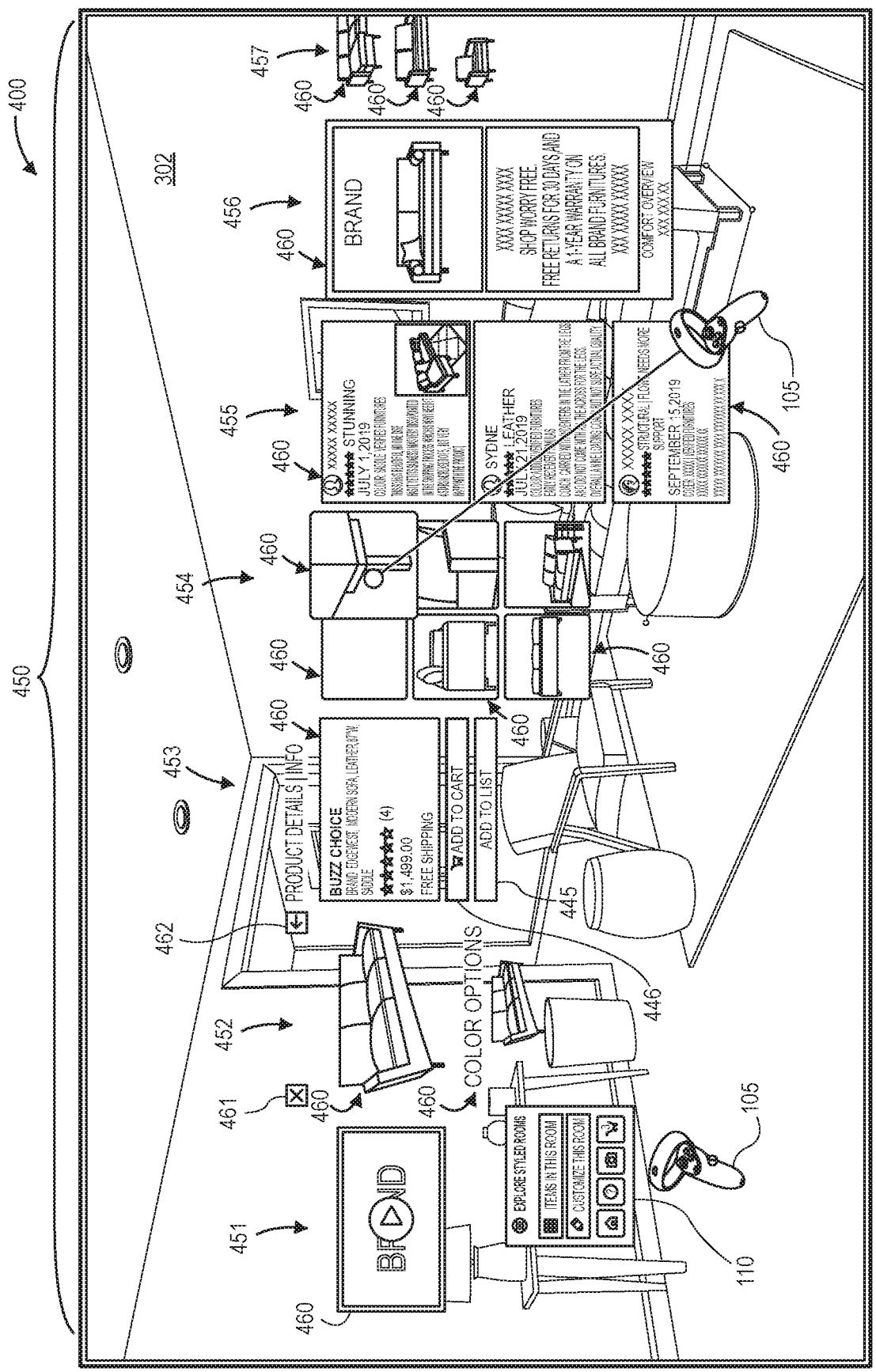
FIG. 4 is a schematic diagram of an example user interface including a detail page for object exploration within a virtual reality environment, in accordance with implementations of the present disclosure.
Figure 5:
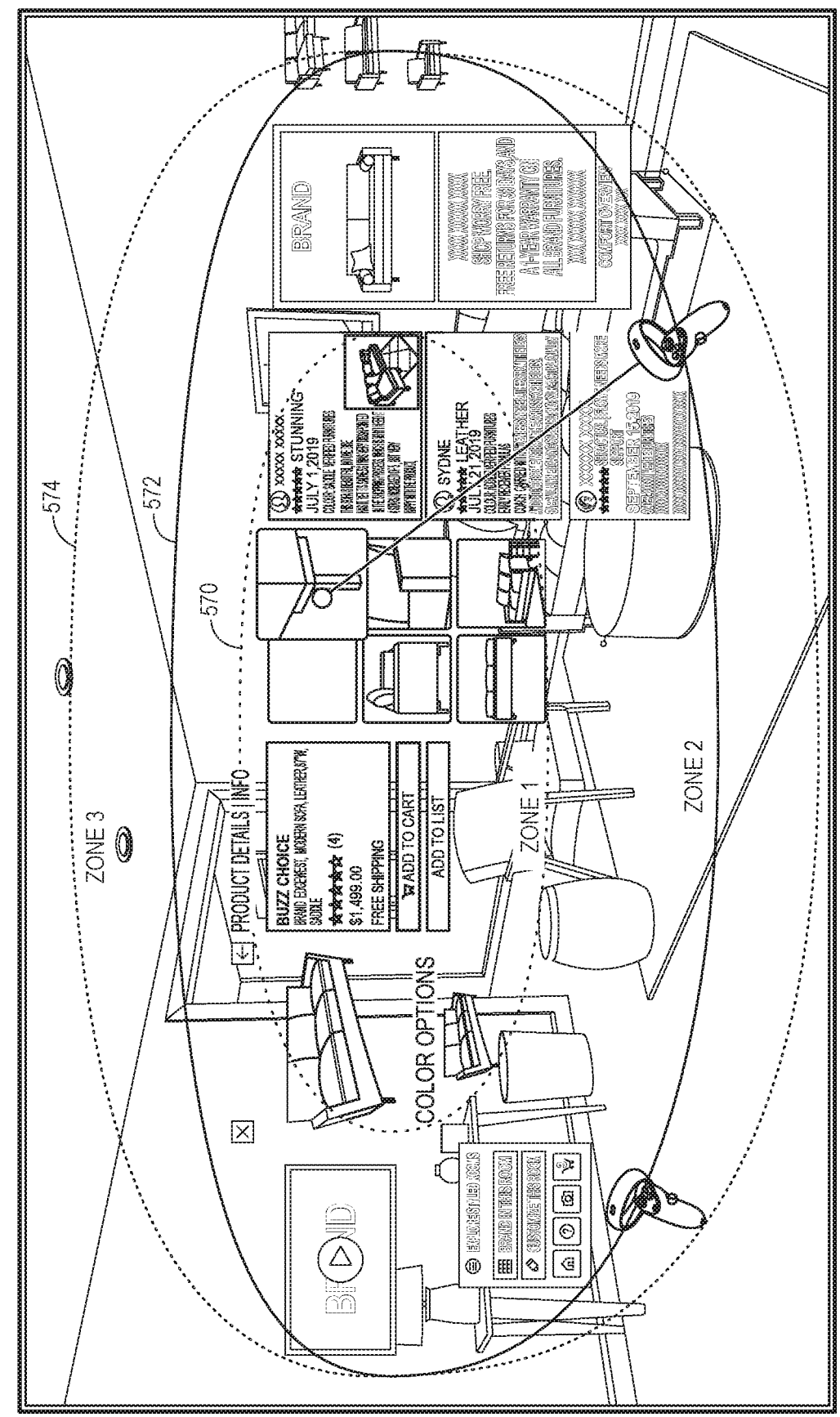
FIG. 5 is a schematic diagram of an example user interface including various zones for object exploration within a virtual reality environment, in accordance with implementations of the present disclosure.
Figure 6:
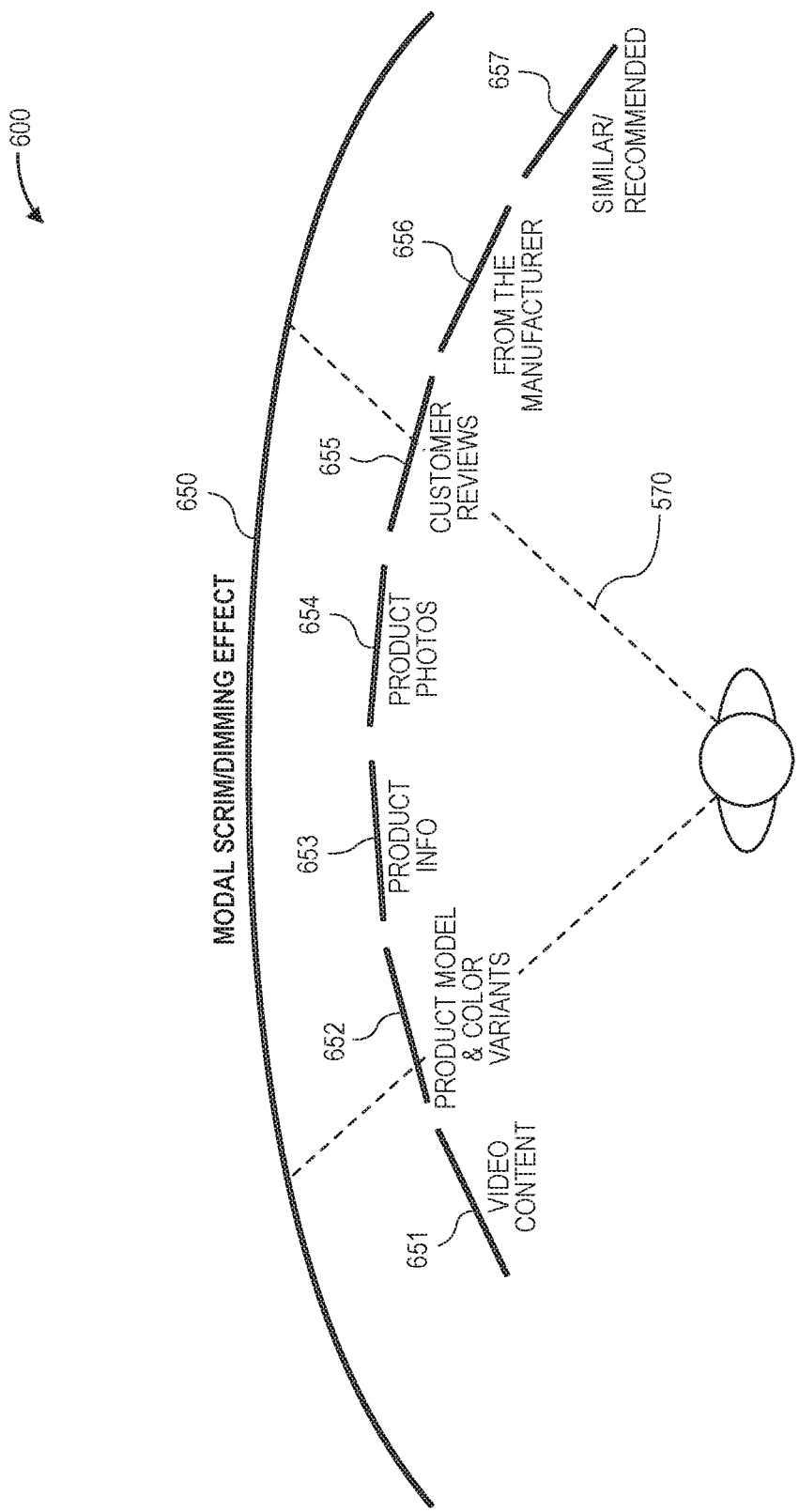
FIG. 6 is a schematic, overhead view diagram of an example user interface including a detail page for object exploration within a virtual reality environment, in accordance with implementations of the present disclosure.

Further, the hover card 232 and object variations 234A may be presented as overlaying the virtual reality environment, e.g., overlaying at least a portion of a room or space within the virtual reality environment. Selection of the other options 234A-N, which may also comprise a "See More" selectable option, may cause presentation of various additional details associated with the object, such as a presentation of scrolling of the object variations 234A to present additional variations or options, an example user interface including a detail card as shown in FIGS. 3A-3B, and/or an example user interface including a detail page as shown in FIGS. 4-6, as further described herein.

In example embodiments, the hover card 232 and object variations 234A may be presented at a defined position and orientation relative to the object 230-1, e.g., a defined distance above the object and angled toward or facing a user position within the virtual reality environment. In other example embodiments, a hover card 232 and object variations 234A may be presented at other defined positions or orientations relative to an object, such as on a right side of the object, on a left side of the object, above the object, below the object, and/or combinations thereof.

In further example embodiments, a defined position or orientation of a hover card 232 and object variations 234A may be determined based on a plurality of factors associated with the object, such as object type, category, size, shape, or other aspects or characteristics of the object, as well as based on a plurality of factors associated with a user, such as user position, field of view, user preferences or settings, or other factors associated with a user. For example, a hover card 232 and object variations 234A associated with an object that is placed on a floor surface may be positioned and oriented at a defined distance above the object, whereas a hover card 232 and object variations 234A associated with an object that is attached to a ceiling surface may be positioned and oriented at a defined distance below the object. In other examples, a hover card 232 and object variations 234A may generally be positioned and oriented at a default position and orientation relative to an object, e.g., on a right side of an object, on a left side of an object, or other positions/orientations. However, if a current field of view of a user does not provide sufficient space to present a hover card 232 and object variations 234A in a default position/orientation, e.g., on a right side, relative to an object, then the hover card 232 and object variations 234A may instead be positioned and oriented in another position/orientation, e.g., on a left side, relative to the object within the current field of view, based at least in part on an available space associated with the current field of view. Furthermore, if a determined position and orientation for presentation of a hover card 232 and object variations 234A is within a defined distance of a user position, e.g., within 1 ft, 3 ft, 6 ft, or other defined distance, then the hover card 232 and object variations 234A may not be presented within such a defined distance to a user position, in order to prevent occluding or blocking a field of view of a user by the presentation of a hover card 232 and object variations 234A that may be too close to a current user position within the virtual reality environment.

Moreover, in some example embodiments, the position and orientation of the hover card 232 and object variations 234A may be determined based on positions or orientations of other objects or portions of the environment. For example, a position and orientation of a hover card 232 and object variations 234A may be determined to avoid collisions or interferences with other objects or portions of the environment, e.g., by presenting the hover card 232 and object variations 234A at a position and orientation relative to an object that is removed or separated from other objects or portions of the environment.

Furthermore, in some example embodiments, hover cards 232 and object variations 234A may be presented in positions that may interfere with or collide with portions of virtual reality environments, such as walls, floors, ceilings, or other environment surfaces, and/or furniture, furnishings, fixtures, or other objects within virtual reality environments. In order to provide comfortable and desired user experiences that do not include unnatural or unexpected visual presentations, various actions may be performed to avoid, resolve, or eliminate such interferences or collisions. For example, a user position may be moved or rotated such that an interference between a hover card and object variations and a portion of a virtual reality environment may be avoided. In addition, a user may be instructed, e.g., via audio or haptic feedback and/or audio or visual instructions, to move or rotate a user position to avoid interference prior to presenting a hover card and object variations. Further, a portion of the hover card and object variations may be visually presented as partially transparent or translucent to indicate the interference. Moreover, a portion of the virtual reality environment may be visually presented as partially transparent or translucent to indicate the interference. Various other actions or combinations thereof may be performed to avoid, resolve, or eliminate interferences or collisions between a hover card and object variations and other objects or portions of virtual reality environments.

FIG. 2B is a schematic diagram 200B of another example user interface including a hover card for object exploration within a virtual reality environment, in accordance with implementations of the present disclosure.

As shown in FIG. 2B, responsive to selection of the view styled rooms 120 option in FIG. 1, responsive to selection of the build your room 122 option in FIG. 1 and placement of at least one object within a room or space, and/or responsive to selection of the search products 124 option and placement of at least one object within a room or space, an example virtual reality environment 202 including at least one object, e.g., a three-dimensional object or model, may be presented to a user within a virtual reality environment. The example virtual reality environment 202 may include a plurality of environment surfaces and/or one or more objects, which may include any and all features as further described at least with respect to FIG. 2A.

Various user interactions with a plurality of objects within a virtual reality environment may be enabled to facilitate exploration of one or more objects. For example, responsive to receiving a hover indication with respect to an object, e.g., based on directing or aiming a pointing device associated with a controller 105 onto an object, at least one additional detail associated with the object may be presented, such as a price, user rating, brand, material, color, dimensions, object variations or options, or any other aspect or characteristic of the object. In some example embodiments, the additional details that may be presented upon receiving a hover indication may be additional details that are related to one or more filters selected by a user. For example, if a user selected one or more filters related to materials, the additional details that may be presented upon receiving a hover indication may be related to materials included in the object. In addition, a visual presentation of the object may be modified responsive to the hover indication, such as by highlighting, outlining, pulsing, changing size, or other visual indications.

As shown in FIG. 2B, upon receiving a hover indication with respect to the table 230-1 within the environment 202, a hover card 232 and one or more object variations or options 234B may be presented to a user. The hover card 232 may include at least one additional detail associated with the table 230-1, such as price, material, finish, or any other aspect or characteristic of the object. In addition, the object variations or options 234B may include various different material, color, texture, finish, paint, size, shape, or other object variations or options. For example, the object variations 234B may include a first material and/or finish 234B-1, a second material and/or finish 234B-2, a third material and/or finish 234B-3, a fourth material and/or finish 234B-4, and/or various other materials, finishes, or other options 234B-N, and selecting or toggling through the various object variations 234B may cause corresponding modifications to a presentation of the object 230-1. Further, the hover card 232 and object variations 234B may be presented as overlaying the virtual reality environment, e.g., overlaying at least a portion of a room or space within the virtual reality environment. Selection of the other options 234B-N, which may also comprise a "See More" selectable option, may cause presentation of various additional details associated with the object, such as a presentation of scrolling of the object variations 234B to present additional variations or options, an example user interface including a detail card as shown in FIGS. 3A-3B, and/or an example user interface including a detail page as shown in FIGS. 4-6, as further described herein.

In contrast with the example user interface shown in FIG. 2A, the example user interface of FIG. 2B may present the object variations 234B as coupled or attached to an edge, side, or portion of the hover card 232. For example, the object variations 234B may be coupled to a bottom, top, left, or right side of the hover card 232. Further, a current object variation that is associated with the object 230-1 presented within the virtual reality environment may be visually presented as highlighted, outlined, or otherwise visually emphasized. In the example of FIG. 2B, the object variation 234B-2 is highlighted or outlined to indicate that this object variation is associated with the object 230-1 as currently presented within the virtual reality environment.

Furthermore, to facilitate user interaction with and manipulation of the object variations 234B, one or more visual cues 236B may be presented in association with the object variations 234B to enable selection among the object variations 234B. As shown in FIG. 2B, the one or more visual cues 236B may comprise a left arrow cue 236B-1 and a right arrow cue 236B-2 to indicate additional object variations that may be selectable using right or left buttons, right or left joystick movements, or other inputs received via a controller associated with a user. In example embodiments, the visual cues 236B may guide a user to select among the object variations 234B using one or more input elements or buttons associated with a controller, instead of using a pointing device associated with a controller to point to and select among the object variations 234B. In additional example embodiments, one or more visual cues may also be presented with the object variations 234A as shown in FIG. 2A, in order to similarly guide user selection among the object variations 234A using one or more input elements or buttons associated with a controller.

Moreover, the position and orientation of the hover card 232 and object variations 234B shown in FIG. 2B may be determined using any and all of the features, and based on any and all of the plurality of factors, as described at least with respect to FIG. 2A.

FIG. 3A is a schematic diagram 300A of an example user interface including a detail card for object exploration within a virtual reality environment, in accordance with implementations of the present disclosure.

As shown in FIG. 3A, responsive to selection of the view styled rooms 120 option in FIG. 1, responsive to selection of the build your room 122 option in FIG. 1 and placement of at least one object within a room or space, and/or responsive to selection of the search products 124 option and placement of at least one object within a room or space, an example virtual reality environment 302 including at least one object, e.g., a three-dimensional object or model, may be presented to a user within a virtual reality environment. The example virtual reality environment 302 may include a plurality of environment surfaces, such as one or more wall, floor, ceiling, or other environment surfaces, that define a room or space, and the environment 302 may also include one or more objects, such as furniture, furnishings, fixtures, or other objects. As shown in FIG. 3A, the room or space may include a plurality of objects, such as a floor, walls, ceiling, doorways, windows, rug, lamps, sofa, tables, chairs, artwork, and other furniture, furnishings, fixtures, or other objects.

Each of the plurality of objects may be presented as a two-dimensional image or a three-dimensional model that is associated with each of the objects. In some example embodiments, to improve user experience, the virtual reality environment may initially be presented with two-dimensional images that may be processed and presented relatively quickly, and upon processing or loading associated three-dimensional models, the three-dimensional models may replace the two-dimensional images within the virtual reality environment to provide a more immersive, three-dimensional experience within the virtual reality environment. Further, the processing or loading of associated three-dimensional models may be ordered or prioritized to load those three-dimensional models that are closest to a user position, before loading those three-dimensional models that are farther from a user position. In other example embodiments, the processing or loading of associated three-dimensional models may be ordered or prioritized to load those three-dimensional models that are within a field of view of a user, before loading those three-dimensional models that are not within a field of view of the user. In further example embodiments, the processing or loading of associated three-dimensional models may be ordered or prioritized to load those three-dimensional models that have larger dimensions, sizes, or shapes, before loading those three-dimensional models that have relatively smaller dimensions, sizes, or shapes. In additional example embodiments, the processing or loading of associated three-dimensional models may be ordered or prioritized to load those three-dimensional models that more closely match recent search queries, filters, or other interactions or inputs received from a user, before loading those three-dimensional models that less closely match recent search queries, filters, or other interactions or inputs received from the user. In other example embodiments, a user may set or select a preference or default setting for either two-dimensional images or three-dimensional models to be presented within the virtual reality environment.

In addition, a menu 110 that may be attached or associated with a controller 105 may change to include one or more selectable options, such as an items in this room button 315 and a customize this room button 316. Various other selectable options may also be included in the menu 110, as further described herein. For example, the items in this room button 315 may cause presentation of a user interface that presents or lists all items currently placed within the room or space, and the customize this room button 316 may cause presentation of a user interface to facilitate searching, browsing, viewing, selecting, movement, placement, or other interactions with various objects that may be added to or removed from presentation within the room or space.

Various user interactions with a plurality of objects within a virtual reality environment may be enabled to facilitate exploration of one or more objects. For example, responsive to receiving a selection input with respect to an object 330-1 and/or responsive to selection of a "See More" selectable option 234A-N, 234B-N associated with an object having a hover indication, as shown in FIGS. 2A-2B, e.g., based on selection input via an input element associated with a controller 105, from a plurality of objects presented within an environment, various additional details associated with the object may be presented, such as a price, user rating, brand, material, color, dimensions, or any other aspect or characteristic of the object. In other example embodiments, the selection input may comprise a click, button press, or touch interface input received while hovering over or pointing at the object via a controller, pointing at the object with both controllers, detecting an eye gaze for a defined amount of time while hovering over or pointing at the object via a controller, or other types or combinations of inputs.

In some example embodiments, the additional details that may be presented upon receiving a selection input may be additional details that are related to one or more filters selected by a user. For example, if a user selected one or more filters related to materials, the additional details that may be presented upon receiving a selection input may include details associated with materials included in the object. In addition, a visual presentation of the object may be modified responsive to the selection input, such as by highlighting, outlining, pulsing, changing size, presentation of dimensions 347, or other visual indications.

In the example shown in FIG. 3A, upon receiving a selection input with respect to an object, e.g., a sofa 330-1 presented within the room or space of the virtual reality environment, the additional details associated with the selected object may include a detail card 340 associated with the selected object 330-1, and a plurality of selectable options, such as a replace or swap button 341, a duplicate button 342, a remove or delete button 343, a full details button 344, an add to list button 345, and an add to shopping cart button 346. In addition, the detail card 340 and the selectable options may be presented as overlaying the virtual reality environment, e.g., overlaying at least a portion of a room or space within the virtual reality environment. Various other selectable options may also be presented with the detail card 340, as further described herein.

The detail card 340 may include additional details associated with the selected object, such as badges, e.g., "Best Seller," name, materials, brand, price, user rating, availability information, shipping information, or other aspects or characteristics of the selected object. In example embodiments, the detail card 340 may include more types of information, details, and/or text associated with the selected object whereas hover cards described herein may focus on one or only a few different types of information, details, and/or text associated with the hovered object. Moreover, a detail card 340 may have a configurable limit on the number of characters allotted for text or strings that may be presented within the detail card 340, which limit may be higher than a character limit associated with a hover card, and characters may be presented within the detail card 340 at a particular font size, e.g., at a defined distance from the user, that is smaller than a particular font size of characters presented within a hover card, e.g., at the same defined distance from the user. Further, a detail card 340 may be configured to occupy a particular size, area, or dimensions within the field of view of a user, e.g., at a defined distance from the user, that is larger than the particular size, area, or dimensions occupied by a hover card, e.g., at the same defined distance from the user.

In addition, the replace button 341 may cause presentation of a user interface via which a user may select an object from among similar, related, or other objects to replace the currently selected object 330-1. The duplicate button 342 may cause presentation of another two-dimensional image or three-dimensional model of the selected object 330-1 for movement and placement within the room or space. The delete button 343 may cause the selected object 330-1 to be removed from and no longer presented within the room or space. The full details button 344 may cause presentation of a product detail page associated with the selected object that may include images, videos, all additional details, product options, user reviews, brand or manufacturer information, similar, related, or recommended products, or other information and details, as further described herein at least with respect to FIGS. 4-6. The add to list button 345 may enable a user to add the selected object to one or more lists that may be provided to or generated by a user. The add to shopping cart button 346 may enable a user to add the selected object to a shopping cart or list including objects for potential purchase.

In some example embodiments, one or more object variations or options 334A including various different material, color, texture, finish, paint, size, shape, or other object variations or options associated with the selected object 330-1 may also be presented with the detail card 340. For example, the object variations 334A may include various different color, material, size, or other options 334A-1, 334A-2, 334A-3, 334A-4, 334A-5, 334A-6, and selecting or toggling through the various object variations 334A may cause corresponding modifications to a presentation of the selected object 330-1. Further, the object variations 334A may also be presented as overlaying the virtual reality environment, e.g., overlaying at least a portion of a room or space within the virtual reality environment. In addition, selection of a "See More" selectable option may cause presentation of various additional details associated with the object, such as a presentation of scrolling of the object variations 334A to present additional variations or options, and/or an example user interface including a detail page as shown in FIGS. 4-6, as further described herein.

As shown in FIG. 3A, the example user interface may present the object variations 334A as coupled or attached to an edge, side, or portion of the detail card 340. For example, the object variations 334A may be coupled to a bottom, top, left, or right side of the detail card 340. Further, a current object variation that is associated with the object 330-1 presented within the virtual reality environment may be visually presented as highlighted, outlined, or otherwise visually emphasized. In the example of FIG. 3A, the object variation 334A-2 is highlighted or outlined to indicate that this object variation is associated with the object 330-1 as currently presented within the virtual reality environment.

Furthermore, to facilitate user interaction with and manipulation of the object variations 334A, one or more visual cues 336A may be presented in association with the object variations 334A to enable selection among the object variations 334A. As shown in FIG. 3A, the one or more visual cues 336A may comprise a left arrow cue 336A-1 and a right arrow cue 336A-2 to indicate additional object variations that may be selectable using right or left buttons, right or left joystick movements, or other inputs received via a controller associated with a user. In example embodiments, the visual cues 336A may guide a user to select among the object variations 334A using one or more input elements or buttons associated with a controller, instead of using a pointing device associated with a controller to point to and select among the object variations 334A.

In example embodiments, the detail card 340 and selectable options may be presented at a defined position and orientation relative to the object 330-1, e.g., a defined distance above and/or to one side of the object and angled toward or facing a user position within the virtual reality environment. In other example embodiments, a detail card 340 and selectable options may be presented at other defined positions or orientations relative to an object, such as on a right side of the object, on a left side of the object, above the object, below the object, and/or combinations thereof.

In further example embodiments, a defined position or orientation of a detail card 340 and selectable options may be determined based on a plurality of factors associated with the object, such as object type, category, size, shape, or other aspects or characteristics of the object, as well as based on a plurality of factors associated with a user, such as user position, field of view, user preferences or settings, or other factors associated with a user. For example, a detail card 340 and selectable options associated with an object that is placed on a floor surface may be positioned and oriented at a defined distance above the object, whereas a detail card 340 and selectable options associated with an object that is attached to a ceiling surface may be positioned and oriented at a defined distance below the object. In other examples, a detail card 340 and selectable options may generally be positioned and oriented at a default position and orientation relative to an object, e.g., on a right side of an object, on a left side of an object, or other positions/orientations. However, if a current field of view of a user does not provide sufficient space to present a detail card 340 and selectable options in a default position/orientation, e.g., on a right side, relative to an object, then the detail card 340 and selectable options may instead be positioned and oriented in another position/orientation, e.g., on a left side, relative to the object within the current field of view, based at least in part on an available space associated with the current field of view. In further examples, a detail card 340 and selectable options may be presented outside a current field of view of a user, and one or more cues or indicators, such as arrows, pointers, or other visual indicators, audio feedback, cues, or indicators, and/or haptic feedback or cues, may be presented to a user to indicate a position and orientation of the detail card 340 and selectable options outside the current field of view of the user.

Moreover, in some example embodiments, the position and orientation of the detail card 340 and selectable options may be determined based on positions or orientations of other objects or portions of the environment. For example, a position and orientation of a detail card 340 and selectable options may be determined to avoid collisions or interferences with other objects or portions of the environment, e.g., by presenting the detail card 340 and selectable options at a position and orientation relative to an object that is removed or separated from other objects or portions of the environment.

Furthermore, in some example embodiments, detail cards 340 and selectable options may be presented in positions that may interfere with or collide with portions of virtual reality environments, such as walls, floors, ceilings, or other environment surfaces, and/or furniture, furnishings, fixtures, or other objects within virtual reality environments. In order to provide comfortable and desired user experiences that do not include unnatural or unexpected visual presentations, various actions may be performed to avoid, resolve, or eliminate such interferences or collisions. For example, a user position may be moved or rotated such that an interference between a detail card and selectable options and a portion of a virtual reality environment may be avoided. In addition, a user may be instructed, e.g., via audio or haptic feedback and/or audio or visual instructions, to move or rotate a user position to avoid interference prior to presenting a detail card and selectable options. Further, a portion of the detail card and selectable options may be visually presented as partially transparent or translucent to indicate the interference. Moreover, a portion of the virtual reality environment may be visually presented as partially transparent or translucent to indicate the interference. Various other actions or combinations thereof may be performed to avoid, resolve, or eliminate interferences or collisions between a detail card and selectable options and other objects or portions of virtual reality environments.

In further example embodiments, one or more portions of the detail card and selectable options may be presented as colliding or interfering with one or more objects or portions of virtual reality environments, and various visual changes may be applied to the one or more portions of the detail card and selectable options and/or the one or more objects or portions of virtual reality environments. For example, borders or outlines associated with portions of the detail card and/or selectable options may not be presented, or may be presented with some amount or degree of transparency, when such borders or outlines collide or interfere with one or more objects or portions of virtual reality environments. In addition, internal sections or backgrounds associated with portions of the detail card and/or selectable options may not be presented, or may be presented with some amount or degree of transparency, when such internal sections or backgrounds collide or interfere with one or more objects or portions of virtual reality environments. Further, text, characters, or symbols associated with portions of the detail card and/or selectable options may continue to be presented, may not be presented, or may be presented with some amount or degree of transparency, when such text, characters, or symbols collide or interfere with one or more objects or portions of virtual reality environments. Moreover, one or more objects or portions of virtual reality environments may be presented with some amount or degree of transparency, when such objects or portions of virtual reality environments collide or interfere with portions of a detail card and selectable options presented within virtual reality environments. The amount or degree of transparency may vary among different portions of detail cards, selectable options, objects, and/or environments, and the amount or degree of transparency may include amounts or degrees such as 20% transparency, 40% transparency, 60% transparency, 80% transparency, or other amounts or degrees of transparency.

Moreover, the detail card and selectable options may be manipulatable by a user within the virtual reality environment. For example, the detail card 340 and selectable options may be movable by a user, e.g., based on a grasping or grabbing input via an input element associated with the controller 105, and responsive to the grasping input, the detail card 340 and selectable options may be moved and placed at a different position relative to a corresponding selected object within the virtual reality environment. Further, a selected or desired position of the detail card 340 and selectable options relative to a corresponding selected object may be saved or persisted during the current session of the virtual reality environment, and/or over multiple sessions associated with the user or user account within the virtual reality environment.

In additional example embodiments, the detail card 340 may be graspable by a user, e.g., based on a grasping or grabbing input via an input element associated with the controller 105, and responsive to the grasping input, the detail card 340 may be attached, coupled, or otherwise associated with the controller 105 via which the grasping input was received. In this manner, the detail card 340 may be attached or tied to a controller 105 at a position that is closer to a user position, the detail card may increase in size responsive to being positioned closer to the user position, and the additional details presented within the detail card 340 may also increase in size responsive to being positioned closer to the user position. In addition, the additional details presented within the detail card 340 may be scrollable by a user within the virtual reality environment, e.g., based on a scrolling input via an input element associated with the controller 105. Further, the detail card 340 may be moved and/or rotated while attached or coupled to the controller 105, e.g., based on movements or rotations associated with the controller 105.

Further, responsive to receiving a grasping input associated with the detail card 340, the selectable options may remain attached or coupled to the detail card 340 and move with the detail card 340 to the position that is closer to the user position. In this manner, the selectable options may also be attached or tied to a controller 105 at a position that is closer to a user position, and the selectable options may also increase in size responsive to being positioned closer to the user position. In addition, the selectable options may remain selectable while attached or tied to the controller 105 within the virtual reality environment, e.g., based on a selection input via an input element associated with the controller 105. Further, the selectable options may also be moved and/or rotated while attached or coupled to the controller 105, e.g., based on movements or rotations associated with the controller 105.

In addition, upon release of a detail card 340 and/or selectable options, e.g., based on a release input via an input element associated with the controller 105, the detail card 340 and/or selectable options may return to a position relative to a corresponding selected object within the virtual reality environment. For example, the detail card 340 and/or selectable options may return to a previous position within the environment from which the detail card 340 and/or selectable options were grasped and manipulated.

Using the various manipulations of detail cards and selectable options, including grasping, movement, rotation, placement, scrolling, and other manipulations, additional details and selectable options associated with a selected object may be more easily viewed, read, understood, or otherwise explored by a user within a virtual reality environment, instead of requiring a user to move or rotate a user position within a virtual reality environment in order to view and explore static, fixed, and/or unmovable detail cards and selectable options within an environment.

FIG. 3B is a schematic diagram 300B of an example user interface including a detail card for object exploration within a virtual reality environment, in accordance with implementations of the present disclosure.

As shown in FIG. 3B, responsive to selection of the view styled rooms 120 option in FIG. 1, responsive to selection of the build your room 122 option in FIG. 1 and placement of at least one object within a room or space, and/or responsive to selection of the search products 124 option and placement of at least one object within a room or space, an example virtual reality environment 302 including at least one object, e.g., a three-dimensional object or model, may be presented to a user within a virtual reality environment. The example virtual reality environment 302 may include a plurality of environment surfaces and/or one or more objects, which may include any and all features as further described at least with respect to FIG. 3A.

Various user interactions with a plurality of objects within a virtual reality environment may be enabled to facilitate exploration of one or more objects. For example, responsive to receiving a selection input with respect to an object 330-1 and/or responsive to selection of a "See More" selectable option 234A-N, 234B-N associated with an object having a hover indication, as shown in FIGS. 2A-2B, e.g., based on selection input via an input element associated with a controller 105, from a plurality of objects presented within an environment, various additional details associated with the object may be presented, such as a price, user rating, brand, material, color, dimensions, or any other aspect or characteristic of the object. In some example embodiments, the additional details that may be presented upon receiving a selection input may be additional details that are related to one or more filters selected by a user. For example, if a user selected one or more filters related to materials, the additional details that may be presented upon receiving a selection input may include details associated with materials included in the object. In addition, a visual presentation of the object may be modified responsive to the selection input, such as by highlighting, outlining, pulsing, changing size, presentation of dimensions 347, or other visual indications.

In the example shown in FIG. 3A, upon receiving a selection input with respect to an object, e.g., a sofa 330-1 presented within the room or space of the virtual reality environment, the additional details associated with the selected object may include a detail card 340 associated with the selected object 330-1, and a plurality of selectable options, such as a replace or swap button 341, a duplicate button 342, a remove or delete button 343, a full details button 344, an add to list button 345, an add to shopping cart button 346, and a close button 361. In addition, the detail card 340 and the selectable options may be presented as overlaying the virtual reality environment, e.g., overlaying at least a portion of a room or space within the virtual reality environment. Various other selectable options may also be presented with the detail card 340, as further described herein.

The detail card 340 may include additional details associated with the selected object, such as badges, e.g., "Best Seller," name, materials, brand, price, user rating, availability information, shipping information, or other aspects or characteristics of the selected object. In addition, the replace button 341 may cause presentation of a user interface via which a user may select an object from among similar, related, or other objects to replace the currently selected object 330-1. The duplicate button 342 may cause presentation of another two-dimensional image or three-dimensional model of the selected object 330-1 for movement and placement within the room or space. The delete button 343 may cause the selected object 330-1 to be removed from and no longer presented within the room or space. The full details button 344 may cause presentation of a product detail page associated with the selected object that may include images, videos, all additional details, product options, user reviews, brand or manufacturer information, similar, related, or recommended products, or other information and details, as further described herein at least with respect to FIGS. 4-6. The add to list button 345 may enable a user to add the selected object to one or more lists that may be provided to or generated by a user. The add to shopping cart button 346 may enable a user to add the selected object to a shopping cart or list including objects for potential purchase. The close button 361 may enable a user to cause the detail card 340 and selectable options associated with the selected object to fade or no longer be presented within the virtual reality environment, e.g., stop presenting the detail card and selectable options.

In further example embodiments, after receiving a selection input with respect to an object 330-1 and during or concurrently with presenting the detail card 340 and selectable options associated with the selected object, a hover indication with respect to the selected object may be further received. Responsive to receiving a hover indication with respect to a selected object, e.g., based on directing or aiming a pointing device associated with a controller 105 onto an object, one or more object variations associated with the object may be presented, such as various different material, color, texture, finish, paint, size, shape, or other object variations or options. In some example embodiments, the one or more object variations that may be presented upon receiving a hover indication may be object variations that are related to one or more filters selected by a user. For example, if a user selected one or more filters related to materials, the object variations that may be presented upon receiving a hover indication may be related to materials included in the object. In addition, a visual presentation of the object may be modified responsive to the hover indication, such as by highlighting, outlining, pulsing, changing size, or other visual indications.

As shown in FIG. 3B, upon receiving a hover indication with respect to the selected table 330-1 within the environment 302, a hover card 332B including one or more object variations or options 334B may be presented to a user. The hover card 332B may include details or information associated with a currently selected or presented object variation, and the object variations or options 334B may include various different material, color, texture, finish, paint, size, shape, or other object variations or options. For example, the object variations 334B may include various different color, material, size, or other options 334B-1, 334B-2, 334B-3, 334B-4, and selecting or toggling through the various object variations 334B may cause corresponding modifications to a presentation of the object 330-1. Further, the hover card 332B and object variations 334B may be presented as overlaying the virtual reality environment, e.g., overlaying at least a portion of a room or space within the virtual reality environment. Selection of a "See More" selectable option may cause presentation of various additional details associated with the object, such as a presentation of scrolling of the object variations 334B to present additional variations or options, and/or an example user interface including a detail page as shown in FIGS. 4-6, as further described herein.

As shown in FIG. 3B, the example user interface may present the object variations 334B as coupled or attached to an edge, side, or portion of the hover card 332B. For example, the object variations 334B may be coupled to a bottom, top, left, or right side of the hover card 332B. Further, a current object variation that is associated with the object 330-1 presented within the virtual reality environment may be visually presented as highlighted, outlined, or otherwise visually emphasized. In the example of FIG. 3B, the object variation 334B-3 is highlighted or outlined to indicate that this object variation is associated with the object 330-1 as currently presented within the virtual reality environment.

Furthermore, to facilitate user interaction with and manipulation of the object variations 334B, one or more visual cues 336B may be presented in association with the object variations 334B to enable selection among the object variations 334B. As shown in FIG. 3B, the one or more visual cues 336B may comprise a left arrow cue 336B-1 and a right arrow cue 336B-2 to indicate additional object variations that may be selectable using right or left buttons, right or left joystick movements, or other inputs received via a controller associated with a user. In example embodiments, the visual cues 336B may guide a user to select among the object variations 334B using one or more input elements or buttons associated with a controller, instead of using a pointing device associated with a controller to point to and select among the object variations 334B.

Moreover, the positions and orientations of the detail card 340 and selectable options, as well as the hover card 332B and object variations 334B shown in FIG. 3B, may be determined using any and all of the features, and based on any and all of the plurality of factors, as described at least with respect to FIGS. 2A-3A.

FIG. 4 is a schematic diagram 400 of an example user interface including a detail page for object exploration within a virtual reality environment, in accordance with implementations of the present disclosure.

As shown in FIG. 4, responsive to selection of a "See More" selectable option 234A-N, 234B-N associated with an object having a hover indication, as shown in FIGS. 2A-2B, responsive to selection of a full details button 344 associated with a selected object, as shown in FIGS. 3A-3B, and/or responsive to selection of a full details button associated with an object presented in a styled room, a customized room, and/or a browse or search interface presenting a plurality of objects, a detail page 450 including a plurality of detail panels may be presented to a user as overlaying an example virtual reality environment 302 that includes at least one object, e.g., a three-dimensional object or model. The example virtual reality environment 302 may include a plurality of environment surfaces, such as one or more wall, floor, ceiling, or other environment surfaces, that define a room or space, and the environment 302 may also include one or more objects, such as furniture, furnishings, fixtures, or other objects. As shown in FIG. 4, the room or space may include a plurality of objects, such as a floor, walls, ceiling, doorways, windows, rug, lamps, sofa, tables, chairs, artwork, and other furniture, furnishings, fixtures, or other objects.

Each of the plurality of objects may be presented as a two-dimensional image or a three-dimensional model that is associated with each of the objects. In some example embodiments, to improve user experience, the virtual reality environment may initially be presented with two-dimensional images that may be processed and presented relatively quickly, and upon processing or loading associated three-dimensional models, the three-dimensional models may replace the two-dimensional images within the virtual reality environment to provide a more immersive, three-dimensional experience within the virtual reality environment. Further, the processing or loading of associated three-dimensional models may be ordered or prioritized to load those three-dimensional models that are closest to a user position, before loading those three-dimensional models that are farther from a user position. In other example embodiments, the processing or loading of associated three-dimensional models may be ordered or prioritized to load those three-dimensional models that are within a field of view of a user, before loading those three-dimensional models that are not within a field of view of the user. In further example embodiments, the processing or loading of associated three-dimensional models may be ordered or prioritized to load those three-dimensional models that have larger dimensions, sizes, or shapes, before loading those three-dimensional models that have relatively smaller dimensions, sizes, or shapes. In additional example embodiments, the processing or loading of associated three-dimensional models may be ordered or prioritized to load those three-dimensional models that more closely match recent search queries, filters, or other interactions or inputs received from a user, before loading those three-dimensional models that less closely match recent search queries, filters, or other interactions or inputs received from the user. In other example embodiments, a user may set or select a preference or default setting for either two-dimensional images or three-dimensional models to be presented within the virtual reality environment.

Various user interactions with a plurality of objects within a virtual reality environment may be enabled to facilitate exploration of one or more objects. For example, responsive to receiving a selection input with respect to a full details button 344 associated with a selected object, as shown in FIGS. 3A-3B, and/or responsive to selection of a "See More" selectable option 234A-N, 234B-N associated with an object having a hover indication, as shown in FIGS. 2A-2B, e.g., based on selection input via an input element associated with a controller 105, from a plurality of objects presented within an environment, various additional details associated with the object may be presented within a detail page 450 including a plurality of detail panels, such as videos, object variations, object aspects or characteristics, images, user reviews, information from a manufacturer or supplier, similar or recommended objects, or other information. In addition, a visual presentation of the selected object may be modified responsive to the selection input, such as by highlighting, outlining, pulsing, changing size, presentation of dimensions, or other visual indications.

In the example shown in FIG. 4, upon receiving a selection input with respect to viewing or exploring full details of an object, e.g., a sofa presented within the room or space of the virtual reality environment, the detail page 450 that is presented associated with the selected object may include a plurality of columns 451, 452, 453, 454, 455, 456, 457 of detail panels 460 associated with the selected object, and a plurality of selectable options, such as an add to list button 445, an add to shopping cart button 446, a close button 461, and a back button 462. Various other selectable options may also be presented with the detail page, as further described herein. In addition, the detail page including the plurality of detail panels may be presented as overlaying the virtual reality environment, e.g., overlaying a room or space within the virtual reality environment, and the room or space may be presented as darkened, dimmed, or grayed out in order to facilitate user focus and interaction with the detail page. In alternative embodiments, the room or space may not be presented as darkened, dimmed, or grayed out when the detail page is presented as overlaying the virtual reality environment to facilitate viewing and evaluation of changes to objects within the room or space responsive to user interactions with the detail page including the plurality of detail panels.

Each of the plurality of columns 451-457 of the detail page may include additional detail panels 460 associated with particular aspects of the object. In example embodiments, the detail panels 460 may include more or substantially all types of information, details, and/or text associated with the selected object, whereas detail cards described herein may include a lesser subset of all types of information, details, and/or text associated with the selected object and hover cards described herein may focus on one or only a few different types of information, details, and/or text associated with the hovered object. Moreover, detail panels 460 may not include any limits on the number of characters allotted for text or strings that may be presented within each detail panel, whereas a detail card 340 may have a configurable limit on the number of characters allotted for text or strings that may be presented within the detail card 340, which limit may be higher than a character limit associated with a hover card. In addition, characters may be presented within detail panels 460 at a particular font size, e.g., at a defined distance from the user, that is smaller than or a same size as a particular font size of characters presented within the detail card 340, e.g., at the same defined distance from the user, which may be smaller than a particular font size of characters presented within a hover card, e.g., at the same defined distance from the user. Further, detail panels 460 may be configured to occupy a particular size, area, or dimensions within the field of view of a user, e.g., at a defined distance from the user, that is larger than the particular size, area, or dimensions occupied by a detail card or a hover card, e.g., at the same defined distance from the user.

For example, the detail panels 460 may include videos associated with the object in a first column 451, object variations, e.g., color, material, finish, size, or other options, in a second column 452, object aspects or characteristics, such as badges, e.g., "Best Seller," name, materials, brand, price, user rating, availability information, shipping information, or other aspects or characteristics, in a third column 453, images associated with the object in a fourth column 454, user reviews, ratings, or other comments associated with the object in a fifth column 455, advertisements or other information from a manufacturer or supplier in a sixth column 456, and similar, related, or recommended objects with respect to the selected object in a seventh column 457. Various other details or other information associated with the object may also be presented in any of the presented columns, or in additional columns, that may be positioned facing and/or arranged around a user position within the virtual reality environment. In addition, each of the object variations presented in the second column 452 and/or each of the similar or recommended objects presented in the seventh column 457 may comprise two-dimensional images or three-dimensional models associated with the object. Further, each of the detail panels associated with columns 451, 453, 454, 455, 456 may comprise substantially two-dimensional images or panels that may present additional information, e.g., videos, text, characters, symbols, images, or other information.

The hover cards, details cards, and detail pages including a plurality of detail panels described herein may provide a nested navigational structure of user interfaces that present different levels or amounts of information to a user of a virtual reality environment. For example, a hover card having a limited amount of information about an object may initially be presented to a user responsive to a hover indication indicating a first level of interest for the object. Then, a detail card having an increased amount of information about the object may be presented to a user responsive to a selection input indicating a second level of interest for the object that is higher than the first level of interest. Further, a detail page including a plurality of detail panels having substantially all information about the object may be presented to a user responsive to selection of a full details option indicating a third level of interest for the object that is higher than the first and second levels of interest. Using such a nested navigational structure and user interfaces associated with different levels of information and/or different levels of interest, a user within a virtual reality environment may quickly browse or view limited details or information about a plurality of objects responsive to hover indications associated such objects while remaining immersed in the virtual reality environment, a user may view and evaluate additional details or information about a particular object responsive to a selection input associated with the object while still remaining substantially immersed in the virtual reality environment, and a user may view and evaluate full details or information about a particular object responsive to selection of a full details option associated with the object while temporarily pausing immersion and interaction within the virtual reality environment. Further, the nested navigational structure may facilitate or maintain orientation and immersion of a user within a virtual reality environment and relative to configurable objects within the environment, and may also allow navigation to and presentation of different levels of details associated with objects as desired.

In addition, the add to list button 445 may enable a user to add the selected object to one or more lists that may be provided to or generated by a user. The add to shopping cart button 446 may enable a user to add the selected object to a shopping cart or list including objects for potential purchase. The close button 461 may enable a user to cause the full details associated with the object to fade or no longer be presented within the virtual reality environment, e.g., stop presenting the detail page including the plurality of detail panels. The back button 462 may enable a user to return to a previous detail page or portion of one or more detail panels, e.g., based on a breadcrumb trail of user inputs or interactions prior to a current presentation of the full details associated with the object.

FIG. 5 is a schematic diagram 500 of an example user interface including various zones for object exploration within a virtual reality environment, in accordance with implementations of the present disclosure.

As shown in FIG. 5, a detail page including a plurality of columns of detail panels may be presented or arranged relative to one or more zones within a field of view of a user of the virtual reality environment. For example, the one or more zones may include a first zone 570, a second zone 572, and a third zone 574. The first zone 570 may be substantially centered within the field of view of the user and may have a first width and a first height that is focused around a center of the field of view, and the first zone 570 may include a first area within the field of view. The second zone 572 may also be substantially centered within the field of view of the user and may have a second width and a second height that is also focused around the center of the field of view. The second width may be greater than the first width and may extend across substantially an entire width of the field of view, and the second height may also be greater than the first height, such that the second zone 572 includes a second area within the field of view that is greater than the first area of the first zone 570. The third zone 574 may also be substantially centered within the field of view of the user and may have a third width and a third height that is also focused around the center of the field of view. The third width may be substantially the same as the second width and may extend across substantially an entire width of the field of view, and the third height may also be greater than the second height and may extend across substantially an entire height of the field of view, such that the third zone 574 includes a third area within the field of view that is greater than the first area of the first zone 570 and also greater than the second area of the second zone 572.

The plurality of columns of detail panels of the detail page may be arranged within the field of view such that different columns of detail panels are primarily presented within different zones of the field of view. For example, detail panels that present information that may be most relevant, important, or useful for a user may be presented substantially within the first zone 570. In addition, detail panels that present information that may be somewhat relevant, important, useful, or secondary for the user may be presented substantially within the second zone 572. Further, detail panels that present information that may be additional, ancillary, supplementary, or tertiary for the user may be presented substantially within the third zone 574.

As shown in FIGS. 4 and 5, the second column 452 of object variations, the third column 453 of object aspects or characteristics, the fourth column 454 of object images, and the fifth column 455 of user reviews may be substantially presented within the first zone 570, based on a determination that the information presented in these columns may be most relevant, important, or useful for a user. In addition, the first column 451 of object videos and the sixth column 456 of other information from a manufacturer or supplier may be substantially presented within the second zone 572, based on a determination that the information presented in these columns may be somewhat relevant, important, useful, or secondary for the user. Further, the seventh column 457 of similar, related, or recommended objects and/or any other columns of detail panels that are presented outside a current field of view may be substantially presented within or outside the third zone 574, based on a determination that the information presented in these columns may be additional, ancillary, supplementary, or tertiary for the user.

Further, in some example embodiments, loading and presentation of images, video, two-dimensional images of objects, three-dimensional models of objects, and/or other data that is to be presented within various detail panels of the detail page may be ordered or prioritized based at least in part on the particular zones within which the detail panels are arranged and presented. For example, images, videos, objects, and/or other data that is to be presented within the first zone 570 may be loaded and presented prior to loading and presenting images, videos, objects, and/or other data that is to be presented within the second zone 572. Likewise, images, videos, objects, and/or other data that is to be presented within the second zone 572 may be loaded and presented prior to loading and presenting images, videos, objects, and/or other data that is to be presented within the third zone 574. Further, images, videos, objects, and/or other data that is to be presented within one or more zones outside a current field of view of a user may be loaded and presented subsequent to loading and presenting images, videos, objects, and/or other data that is to be presented within one or more zones 570, 572, 574 within the current field of view of the user.

Although FIG. 5 illustrates particular columns of detail panels as being presented and arranged in particular zones within the field of view of a user, in other example embodiments, the particular columns of detail panels that are presented in various zones within the field of view of a user may be modified or changed. For example, based on user inputs or interactions within the virtual reality environment, e.g., selection of particular filter criteria, prior search or browse histories, interactions with detail panels by one or more users, or other user inputs or interactions, one or more columns of detail panels may be moved, shifted, or arranged in different relative positions, in order to present detail panels in different zones within the field of view. In other example embodiments, a user may set or select a preference or default setting related to particular columns of detail panels to be presented in various zones within a field of view of a user within the virtual reality environment.

FIG. 6 is a schematic, overhead view diagram 600 of an example user interface including a detail page for object exploration within a virtual reality environment, in accordance with implementations of the present disclosure.

As shown in FIG. 6, a detail page including a plurality of columns of detail panels may be presented as substantially facing and/or arranged around a user position within the virtual reality environment. For example, a plurality of columns 651, 652, 653, 654, 655, 656, 657 of detail panels may be arranged at respective defined distances in front of the user position and substantially in an arc or curve around the user position. Each column may be a substantially flat column having a plurality of detail panels arranged on a vertical surface within a field of view of the user. Further, the plurality of columns may be angled relative to each other and associated with different planes or surfaces, such that each column of detail panels is angled or arranged to substantially face the user position. In other example embodiments, the plurality of columns of detail panels may be associated with a same plane or surface that is presented at a defined distance in front of a user position within the virtual reality environment, and various individual columns of detail panels may not be angled relative to each other.

Furthermore, in some example embodiments as shown in FIG. 6 and as described herein, a dimming effect 650 may be applied or overlaid onto a presentation of the virtual reality environment, e.g., a room or space within the virtual reality environment. The dimming effect 650 may darken, dim, gray out, or otherwise obscure the presentation of the virtual reality environment. In addition, the dimming effect 650 may be applied or overlaid behind the plurality of detail panels of the detail page, such that a user may view and focus on information presented within the plurality of columns of detail panels. Further, as described at least with respect to FIG. 5, an example first zone 570 is illustrated in FIG. 6 from an overhead view to illustrate an example first width of the first zone 570 relative to the plurality of columns of detail panels presented as part of the detail page.

Although FIG. 6 illustrates particular numbers, arrangements, and spacing of columns of detail panels that are presented relative to a user position within a virtual reality environment, in other example embodiments, the particular numbers, arrangements, and spacing of columns of detail panels that are presented relative to a user position may be modified or changed. For example, based on user inputs or interactions within the virtual reality environment, e.g., selection of particular filter criteria, prior search or browse histories, interactions with detail panels by one or more users, or other user inputs or interactions, one or more columns of detail panels may be moved, shifted, or arranged in different relative positions, in order to present detail panels in different arrangements relative to the user position. In addition, respective defined distances between the columns of detail panels and the user position, and/or the spacing between adjacent columns of detail panels, may be modified or changed. In other example embodiments, a user may set or select a preference or default setting related to particular numbers, arrangements, and/or spacing of columns of detail panels that are presented relative to a user position within the virtual reality environment.

Furthermore, with respect to presentation of detail pages having a plurality of columns of detail panels as shown in FIGS. 4-6, in some example embodiments, one or more portions of detail pages having a plurality of detail panels may be presented in positions that may interfere with or collide with portions of virtual reality environments, such as walls, floors, ceilings, or other environment surfaces, and/or furniture, furnishings, fixtures, or other objects within virtual reality environments. In order to provide comfortable and desired user experiences that do not include unnatural or unexpected visual presentations, various actions may be performed to avoid, resolve, or eliminate such interferences or collisions. For example, a user position may be moved or rotated such that an interference between a detail page and a portion of a virtual reality environment may be avoided. In addition, a user may be instructed, e.g., via audio or haptic feedback and/or audio or visual instructions, to move or rotate a user position to avoid interference prior to presenting a detail page. Further, a portion of the detail page may be visually presented as partially transparent or translucent to indicate the interference. Moreover, a portion of the virtual reality environment may be visually presented as partially transparent or translucent to indicate the interference. Various other actions or combinations thereof may be performed to avoid, resolve, or eliminate interferences or collisions between detail pages and portions of virtual reality environments.

In further example embodiments, one or more portions of the detail pages having a plurality of columns of detail panels may be presented as colliding or interfering with one or more objects or portions of virtual reality environments, and various visual changes may be applied to the one or more portions of the detail pages and/or the one or more objects or portions of virtual reality environments. For example, borders or outlines associated with portions of the detail pages may not be presented, or may be presented with some amount or degree of transparency, when such borders or outlines collide or interfere with one or more objects or portions of virtual reality environments. In addition, internal sections or backgrounds and/or images, videos, models, or objects associated with portions of the detail pages may not be presented, or may be presented with some amount or degree of transparency, when such internal sections or backgrounds and/or images, videos, models, or objects collide or interfere with one or more objects or portions of virtual reality environments. Further, text, characters, or symbols associated with portions of the detail pages may continue to be presented, may not be presented, or may be presented with some amount or degree of transparency, when such text, characters, or symbols collide or interfere with one or more objects or portions of virtual reality environments. Moreover, one or more objects or portions of virtual reality environments may be presented with some amount or degree of transparency, when such objects or portions of virtual reality environments collide or interfere with portions of detail pages presented within virtual reality environments. The amount or degree of transparency may vary among different portions of detail pages, objects, and/or environments, and the amount or degree of transparency may include amounts or degrees such as 20% transparency, 40% transparency, 60% transparency, 80% transparency, or other amounts or degrees of transparency.

Various aspects of a detail page including a plurality of columns of detail panels, as shown in FIGS. 4-6, may be manipulatable by a user within the virtual reality environment. For example, the plurality of columns may be moved or panned left or right within the field of view of a user, in order to place or move different columns substantially in a center of the field of view and/or to place or move one or more columns into the field of view, as well as to place or move one or more columns outside the field of view, e.g., based on a movement or panning input via an input element associated with a controller. The movement or panning left or right of the plurality of columns may be a smooth or continuous movement left or right, or the movement or panning left or right of the plurality of columns may be a discontinuous or toggled movement left or right that may have a plurality of set positions between which the columns may be moved.

In addition, within each column, the plurality of detail panels may be scrolled up or down within the field of view of a user, e.g., based on a scrolling input via an input element associated with a controller. For example, images, videos, text, objects, models, or various other data or information presented via the plurality of detail panels within each column may be scrolled up or down by a user to view and explore the presented information within each column.

Figure 7:
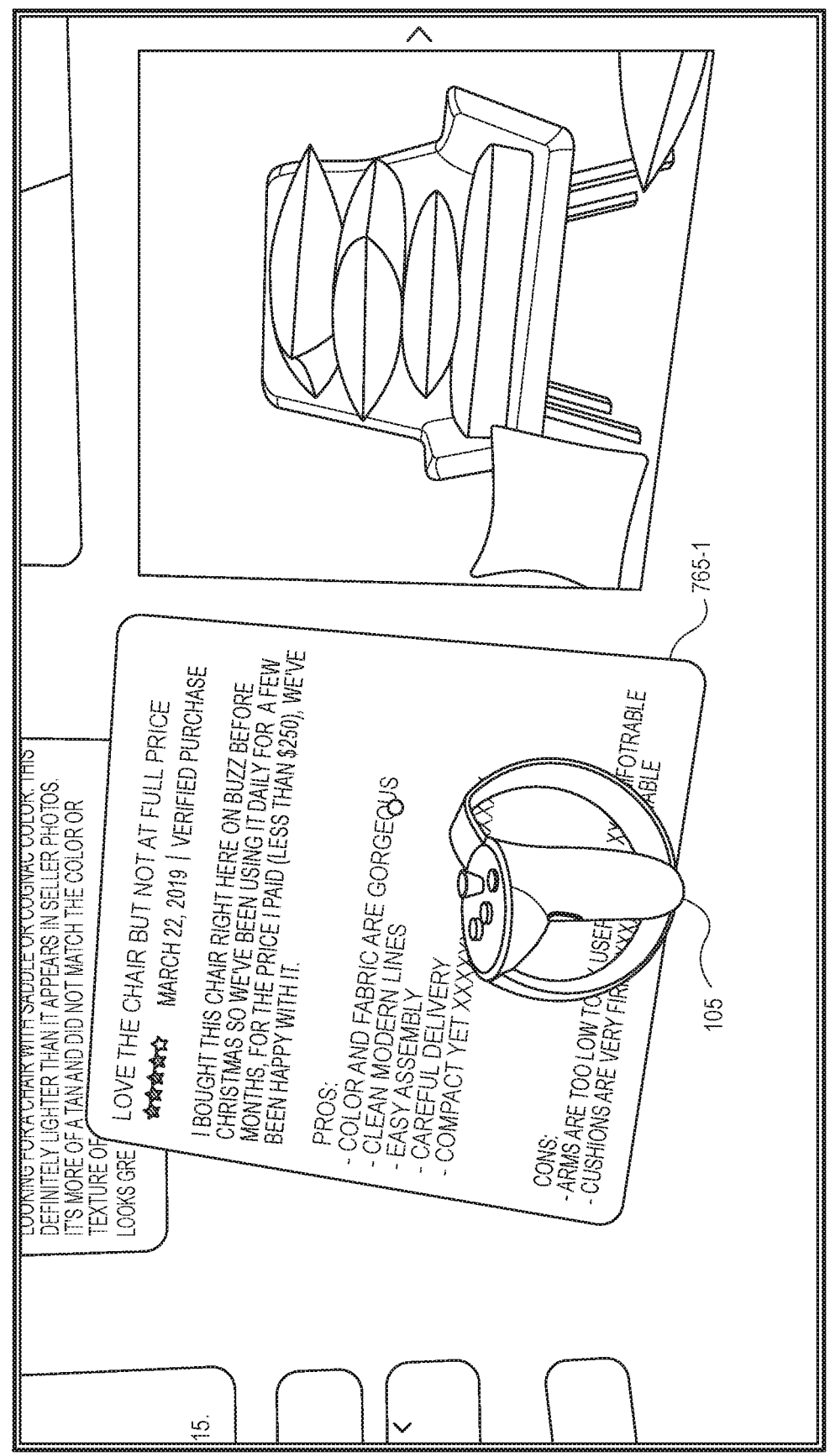
FIG. 7 is a schematic diagram of an example user interface including a detail panel for object exploration and manipulation within a virtual reality environment, in accordance with implementations of the present disclosure.

FIG. 7 is a schematic diagram 700 of an example user interface including a detail panel for object exploration and manipulation within a virtual reality environment, in accordance with implementations of the present disclosure.

Various aspects of individual detail panels of a detail page, as shown in FIGS. 4-6, may be manipulatable by a user within the virtual reality environment. For example, one or more of the plurality of detail panels of the detail page may be manipulatable by a user within the virtual reality environment.

As shown in FIG. 7, a detail panel 765-1 may be graspable by a user, e.g., based on a grasping or grabbing input via an input element associated with the controller 105, and responsive to the grasping input, the detail panel 765-1 may be attached, coupled, or otherwise associated with the controller 105 via which the grasping input was received. In this manner, the detail panel 765-1 may be attached or tied to a controller 105 at a position that is closer to a user position, the detail card may increase in size responsive to being positioned closer to the user position, and the additional details presented within the detail panel 765-1 may also increase in size responsive to being positioned closer to the user position. In addition, the additional details presented within the detail panel 765-1 may be scrollable by a user within the virtual reality environment, e.g., based on a scrolling input via an input element associated with the controller 105. Further, the detail panel 765-1 may be moved and/or rotated while attached or coupled to the controller 105, e.g., based on movements or rotations associated with the controller 105.

Further, responsive to receiving a grasping input associated with the detail panel 765-1, one or more selectable options that may be associated with the detail panel 765-1 may remain attached or coupled to the detail panel 765-1 and move with the detail panel 765-1 to the position that is closer to the user position. In this manner, one or more selectable options may also be attached or tied to a controller 105 at a position that is closer to a user position, and the selectable options may also increase in size responsive to being positioned closer to the user position. In addition, the selectable options may remain selectable while attached or tied to the controller 105 within the virtual reality environment, e.g., based on a selection input via an input element associated with the controller 105. Further, the selectable options may also be moved and/or rotated while attached or coupled to the controller 105, e.g., based on movements or rotations associated with the controller 105.

In addition, upon release of a detail panel 765-1, e.g., based on a release input via an input element associated with the controller 105, the detail panel 765-1 may return to a position relative to other detail panels of the detail page within the virtual reality environment. For example, the detail panel 765-1 may return to a previous position within a column of detail panels of the detail page within the environment from which the detail panel 765-1 was grasped and manipulated.

Using the various manipulations of detail pages, columns of detail panels, and/or one or more individual detail panels, including panning or scrolling of columns, grasping, movement, rotation, scrolling, or release of individual detail panels, and/or other manipulations, additional details and selectable options presented via a detail page having a plurality of detail panels associated with an object may be more easily viewed, read, understood, or otherwise explored by a user within a virtual reality environment, instead of requiring a user to move or rotate a user position within a virtual reality environment in order to view and explore static, fixed, and/or unmovable detail pages, columns of detail panels, and/or one or more individual detail panels that are presented within an environment.

Further, responsive to receiving a grasping input with respect to an object presented via a detail page having a plurality of detail panels, e.g., based on a grasping or grabbing input via an input element associated with the controller 105, a three-dimensional model of the object may be placed or applied within the virtual reality environment, e.g., within the room or space of the virtual reality environment. For example, responsive to receiving the grasping input with respect to an object variation or a similar or recommended object, the detail page having the plurality of detail panels may fade or no longer be presented, a three-dimensional model of the object may be attached to, held, moved, and/or oriented using the controller within the virtual reality environment, the three-dimensional model of the object may increase in size to an actual size relative to the room or space of the virtual reality environment, and the object may be placed within the room or space by a user, e.g., based on a release or placement input via an input element associated with the controller.

Furthermore, in some example embodiments, a text search among text, characters, or symbols that may be presented within hover cards, detail cards, and/or detail pages may be initiated via voice input. For example, in order to search text that may be presented in hover cards, as shown in FIGS. 2A-2B, detail cards, as shown in FIGS. 3A-3B, and/or detail pages having a plurality of detail panels, as shown in FIGS. 4-7, a user may initiate a voice input via an input element associated with a controller or via an input element or button associated with the virtual reality environment. Then, the user may provide a spoken command or instruction to search currently presented text for a particular word, keyword, string, or other text. The spoken command or instruction may be processed, e.g., using speech-to-text analysis techniques or algorithms, to identify the particular word, keyword, string, or other text of interest to the user. Based on the processed command or instruction, text that is currently presented within hover cards, detail cards, and/or detail pages may be searched to identify the particular words, keywords, or strings. Further, in some example embodiments, upon identifying the particular words, keywords, or strings within currently presented text, a visual presentation of the identified words, keywords, or strings may be modified, such as by highlighting, outlining, pulsing, changing size, changing color, or other visual indications. In other example embodiments, upon identifying the particular words, keywords, or strings within currently presented text, paragraphs, sentences, or other excerpts or portions of the presented text that includes the identified words, keywords, or strings may be output as audio output, e.g., using text-to-speech techniques or algorithms, and/or as visual output, e.g., in a list or user interface including identified excerpts or portions of presented text that includes the identified words, keywords, or strings.

Furthermore, although the user interfaces are generally described herein in the context of viewing or exploring furniture, e.g., from a catalog of objects, in other example embodiments, the user interfaces may be used to present information or details associated with different types of objects, including furniture, furnishings, fixtures, or other objects, objects that are currently present in a room or space, objects that are included in one or more lists or groups of objects, objects that are included in a shopping cart or list, and/or other lists or groups of objects, as well as various other aspects related to user experiences within virtual reality environments, such as user account settings, help topics, saved images or screenshots, or other aspects related to users, user accounts, or virtual reality environments.

Figure 8A:
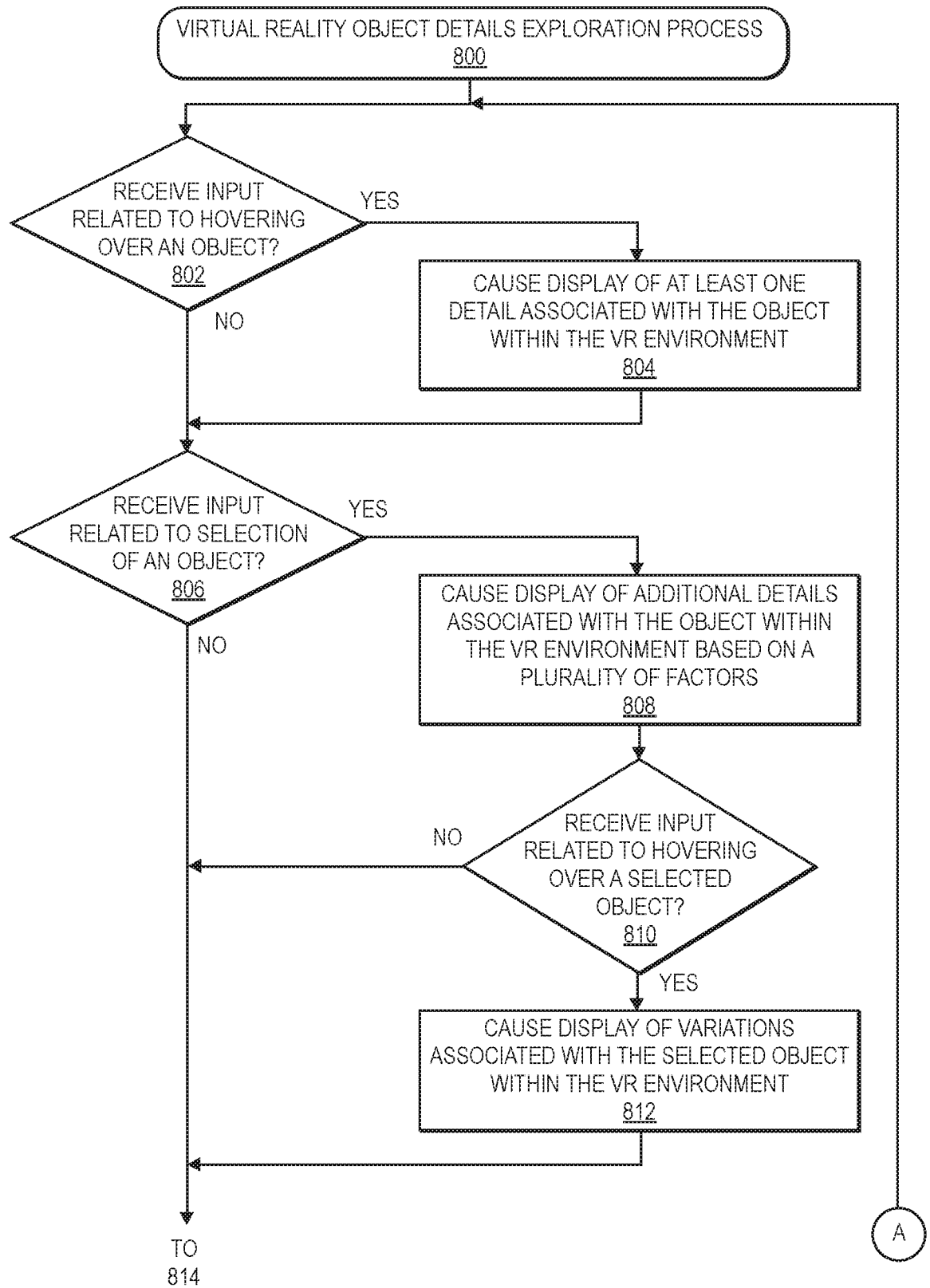
FIGS. 8A-8B are a flow diagram illustrating an example virtual reality object details exploration process, in accordance with implementations of the present disclosure.
Figure 8B:
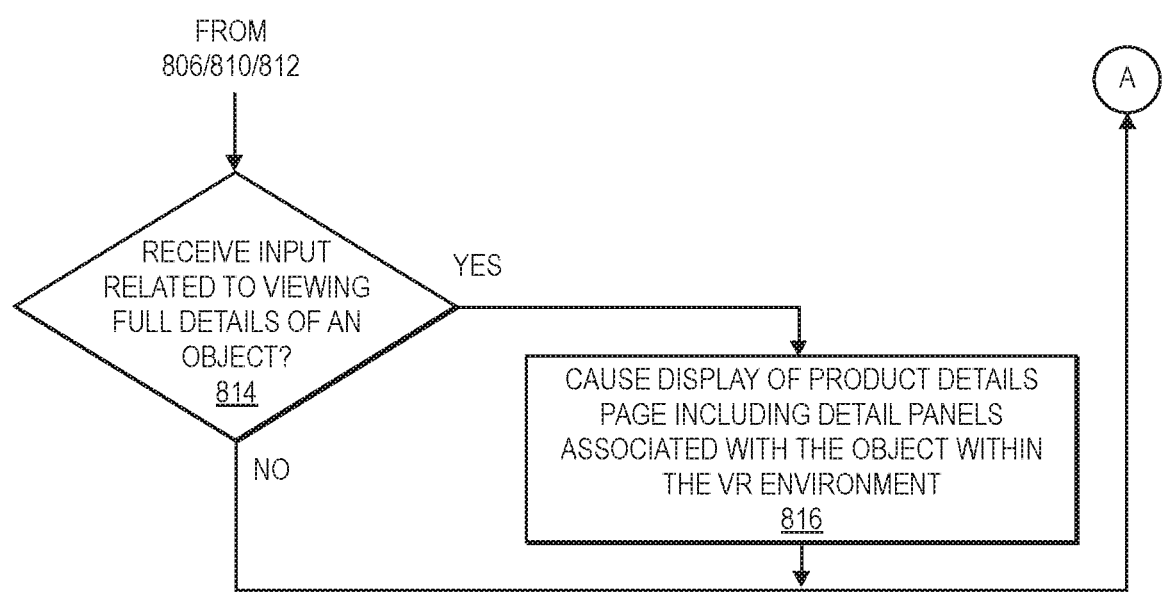

FIGS. 8A-8B are a flow diagram illustrating an example virtual reality object details exploration process 800, in accordance with implementations of the present disclosure.

The process 800 may begin by determining whether an input related to hovering over an object is received, as at 802. For example, various inputs may be received from a user, e.g., inputs received from a pointing device associated with a controller, inputs received via gestures or head/eye tracking, and/or voice inputs, to cause presentation of at least one additional detail associated with an object that may include a hover indication over the object.

If it is determined that an input related to hovering over an object is received, then the process 800 may continue by causing a display of at least one additional detail associated with the object within the virtual reality environment, as at 804. For example, a display or presentation device may change a visual presentation of the object, such as by highlighting, outlining, pulsing, changing size, or other visual indications, within the virtual reality environment. In addition, the display or presentation device may present at least one additional detail, e.g., in a hover card or panel, associated with the object within the virtual reality environment. Further, the hover card or panel may be positioned or oriented generally above, on a side of, or in a different default position or orientation relative to the object. The at least one additional detail may be presented as overlaid, e.g., in a hover card or panel, on top of a presentation of the virtual reality environment.

The process 800 may then proceed by determining whether an input related to selection of an object is received, as at 806. For example, various inputs may be received from a user, e.g., inputs received by a controller, inputs received via gestures, and/or voice inputs, to cause presentation of additional details associated with a selected object.

If it is determined that an input related to selection of an object is received, then the process 800 may continue to cause a display of additional details associated with the object within the virtual reality environment based on a plurality of factors, as at 808. For example, a display or presentation device may present various additional details and/or selectable options associated with the selected object, e.g., in a detail card or panel, within the virtual reality environment. In addition, the additional details may be presented in the detail card or panel that may be positioned and oriented based on a plurality of factors, such as a field of view of the user, aspects or characteristics of the object, other objects presented proximate the object within the virtual reality environment, portions of the environment presented proximate the object within the virtual reality environment, or other factors. The additional details may be presented as overlaid, e.g., in a detail card or panel, on top of a presentation of the virtual reality environment.

The process 800 may then proceed by determining whether an input related to hovering over a selected object is received, as at 810. For example, various inputs may be received from a user, e.g., inputs received from a pointing device associated with a controller, inputs received via gestures or head/eye tracking, and/or voice inputs, to cause presentation of object variations associated with an object that may include a hover indication over the object.

If it is determined that an input related to hovering over a selected object is received, then the process 800 may continue to cause a display of object variations associated with the selected object within the virtual reality environment, as at 812. For example, a display or presentation device may change a visual presentation of the selected object, such as by highlighting, outlining, pulsing, changing size, or other visual indications, within the virtual reality environment. In addition, the display or presentation device may present object variations, e.g., in a hover card or panel, associated with the object within the virtual reality environment. Further, the hover card or panel may be positioned or oriented generally above, on a side of, or in a different default position or orientation relative to the object. The object variations may be presented as overlaid, e.g., in a hover card or panel, on top of a presentation of the virtual reality environment.

The process 800 may then proceed to determine whether an input related to viewing full details of an object is received, as at 814. For example, various inputs may be received from a user, e.g., inputs received by a controller, inputs received via gestures, and/or voice inputs, to cause presentation of full details associated with a selected object.

If it is determined that an input related to viewing full details of an object is received, then the process 800 may continue with causing a display of a product details page including detail panels associated with the object within the virtual reality environment, as at 816. For example, a display or presentation device may present additional details associated with the selected object, e.g., in a plurality of columns of detail panels within the detail page, within the virtual reality environment. In addition, the additional details may be presented in the plurality of detail panels that may be positioned and oriented on one or more vertical surfaces presented at respective defined distances in front of a user position and substantially facing or arranged around the user position. Further, the plurality of detail panels may be associated with various zones within a field of view of a user, such as a first zone presenting primary information, a second zone presenting secondary information, and a third zone presenting tertiary information. The additional details may be presented as overlaid, e.g., in a plurality of columns of detail panels within the detail page, on top of a presentation of the virtual reality environment.

The process 800 may then return to step 802 to continue to determine whether inputs related to hovering over an object, selecting an object, and/or viewing full details of an object are received.

The process 800 may be repeated in various manners or sequences to cause presentation of various levels or amounts of information associated with objects presented within a virtual reality environment, e.g., using hover cards, detail cards, and/or detail pages having a plurality of detail panels, responsive to various inputs or interactions received from users within virtual reality environments, such as hover indications, selection inputs, and/or full detail viewing inputs. Moreover, the presentation of various levels or amounts of information may be nested or hierarchical, e.g., hover cards, detail cards, and detail pages may be individually presented at a first nested or hierarchical level, and hover cards may be presented during presentation of detail cards at a second nested or hierarchical level. Further, various other functions, actions, or operations may be performed responsive to various other types of inputs or interactions described herein in the context of virtual reality environments, objects presented therein, and information associated with such objects.

Figure 9A:
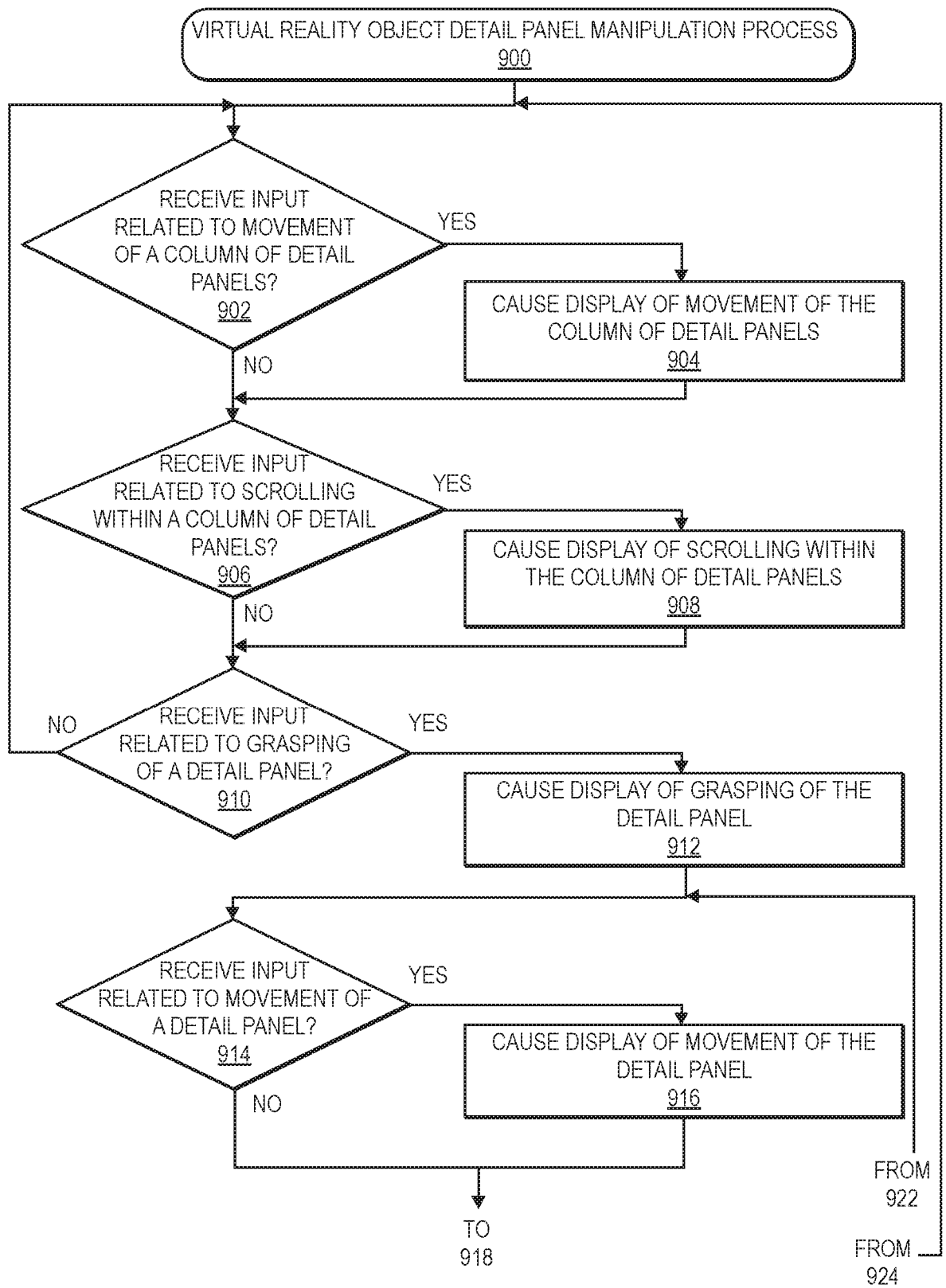
FIGS. 9A-9B are a flow diagram illustrating an example virtual reality object detail panel manipulation process, in accordance with implementations of the present disclosure.
Figure 9B:
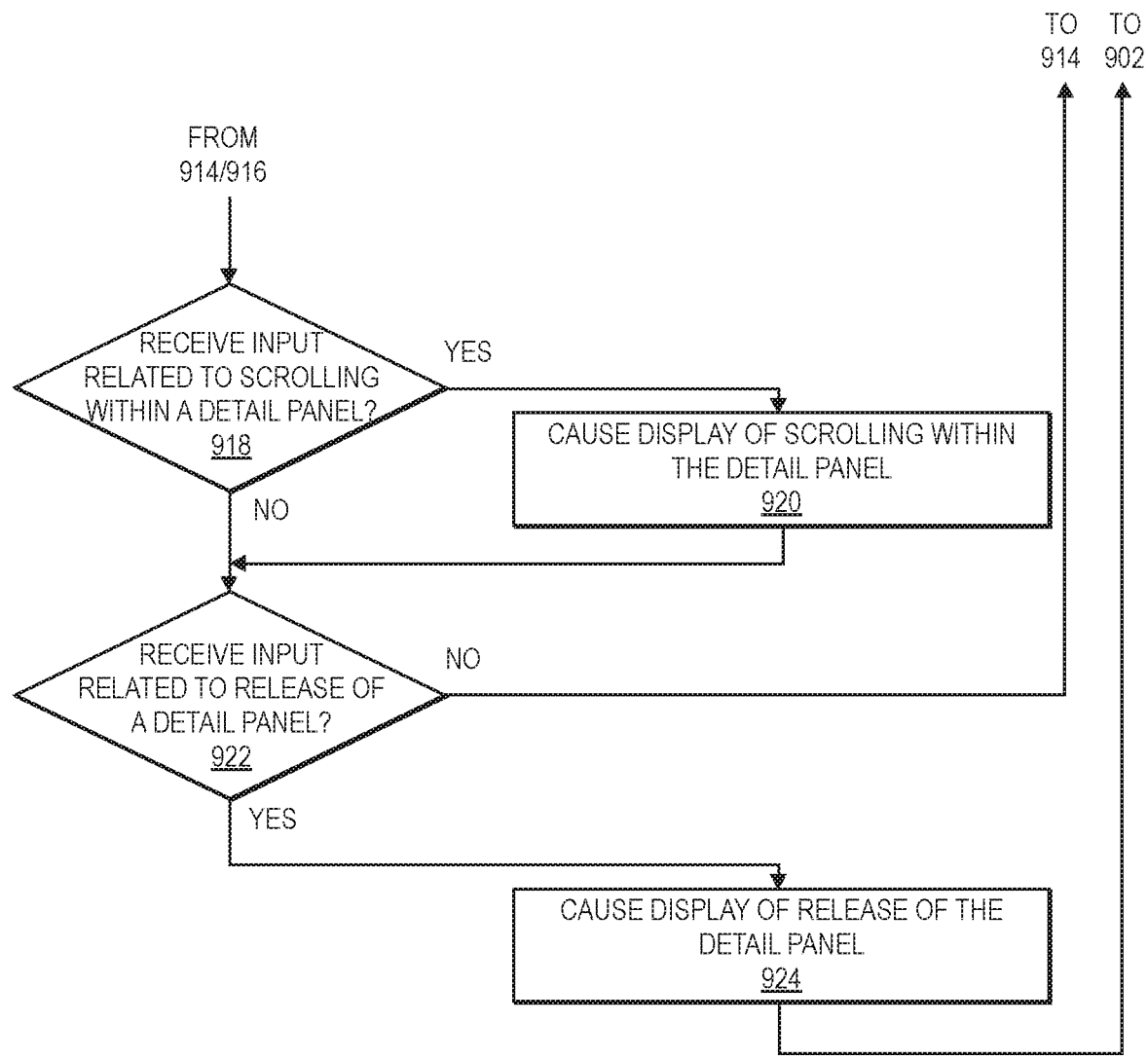

FIGS. 9A-9B are a flow diagram illustrating an example virtual reality object detail panel manipulation process 900, in accordance with implementations of the present disclosure.

The process 900 may begin by determining whether an input related to movement of a column of detail panels is received, as at 902. For example, various inputs may be received from a user, e.g., inputs received by a controller, inputs received via gestures, and/or voice inputs, to cause presentation of movement of a column of detail panels that are presented to provide information associated with objects within a virtual reality environment.

If it is determined that an input related to movement of a column of detail panels is received, then the process 900 may continue by causing a display of movement of the column of detail panels, as at 904. For example, a display or presentation device may cause presentation of movement of a column of detail panels, e.g., panning or other movement of one or more columns of detail panels of a detail page, that are presented within a field of view of a user. In some example embodiments, multiple or all columns of detail panels may move or pan together within the field of view. In other example embodiments, individual columns of detail panels may move, pan, or be rearranged or reorganized substantially independently of other columns of detail panels within the field of view.

The process 900 may proceed by determining whether an input related to scrolling within a column of detail panels is received, as at 906. For example, various inputs may be received from a user, e.g., inputs received by a controller, inputs received via gestures, and/or voice inputs, to cause presentation of scrolling within a column of detail panels that are presented to provide information associated with objects within a virtual reality environment.

If it is determined that an input related to scrolling within a column of detail panels is received, then the process 900 may continue to cause a display of scrolling within the column of detail panels, as at 908. For example, a display or presentation device may cause presentation of scrolling within a column of detail panels, e.g., scrolling through a plurality of detail panels presented within a column of a detail page, that are presented within the virtual reality environment. In some example embodiments, multiple or all columns of detail panels may scroll together within the field of view. In other example embodiments, individual columns of detail panels may scroll substantially independently of other columns of detail panels within the field of view.

The process 900 may proceed to determine whether an input related to grasping of a detail panel is received, as at 910. For example, various inputs may be received from a user, e.g., inputs received by a controller, inputs received via gestures, and/or voice inputs, to cause presentation of grasping of a detail panel or detail card that is presented to provide information associated with objects within a virtual reality environment.

If it is determined that an input related to grasping of a detail panel is not received, then the process 900 may return to step 902 to continue to determine whether inputs related to moving or scrolling within one or more columns of detail panels are received.

If, however, it is determined that an input related to grasping of a detail panel is received, then the process 900 may continue with causing a display of grasping of the detail panel, as at 912. For example, a display or presentation device may cause presentation of grasping of a detail panel or detail card such that the detail panel or detail card is moved or removed from a previously presented position or orientation within the virtual reality environment and subsequently presented as attached or coupled to a controller, e.g., responsive to grasping or grabbing the detail panel or detail card via the controller.

The process 900 may then proceed with determining whether an input related to movement of a detail panel is received, as at 914. For example, various inputs may be received from a user, e.g., inputs received by a controller, inputs received via gestures, and/or voice inputs, to cause presentation of movement of a detail panel that is presented to provide information associated with objects within a virtual reality environment.

If it is determined that an input related to movement of a detail panel is received, then the process 900 may continue by causing a display of movement of the detail panel, as at 916. For example, a display or presentation device may cause presentation of movement and/or rotation of a detail panel or detail card that is attached or coupled to a controller, e.g., responsive to grasping the detail panel or detail card via the controller.

The process 900 may proceed by determining whether an input related to scrolling within a detail panel is received, as at 918. For example, various inputs may be received from a user, e.g., inputs received by a controller, inputs received via gestures, and/or voice inputs, to cause presentation of scrolling within a detail panel that is presented to provide information associated with objects within a virtual reality environment.

If it is determined that an input related to scrolling within a detail panel is received, then the process 900 may continue to cause a display of scrolling within the detail panel, as at 920. For example, a display or presentation device may cause presentation of scrolling within a detail panel or detail card that is attached or coupled to a controller, e.g., responsive to grasping the detail panel or detail card via the controller.

The process 900 may then proceed with determining whether an input related to release of a detail panel is received, as at 922. For example, various inputs may be received from a user, e.g., inputs received by a controller, inputs received via gestures, and/or voice inputs, to cause presentation of release of a detail panel or detail card that is presented to provide information associated with objects within a virtual reality environment.

If it is determined that an input related to release of a detail panel is not received, then the process 900 may return to step 914 to continue to determine whether inputs related to moving or scrolling within a grasped detail panel or detail card are received.

If, however, it is determined that an input related to release of a detail panel is received, then the process 900 may continue by causing a display of release of the detail panel, as at 924. For example, a display or presentation device may cause presentation of release of a detail panel or detail card such that the detail panel or detail card is no longer attached or coupled to a controller and subsequently moved or replaced in a previously presented position or orientation within the virtual reality environment, e.g., responsive to release of the previously grasped detail panel or detail card via the controller.

The process 900 may then return to step 902 to continue to determine whether inputs related to moving or scrolling within one or more columns of detail panels are received, and/or whether inputs related to grasping a detail card or detail panel are received.

The process 900 may be repeated in various manners or sequences to cause modifications to presentation, e.g., movement, rotation, panning, scrolling, grasping, and/or release, of one or more detail panels or detail cards that present various information associated with objects within a virtual reality environment, responsive to various inputs or interactions received from users within virtual reality environments, such as movement inputs, rotation inputs, panning inputs, scrolling inputs, grasping inputs, and/or release inputs. Moreover, the presentation of and user interaction with various levels or amounts of information may also be nested or hierarchical, e.g., columns of detail panels presented via a details page may be moved, panned, or scrolled at a first nested or hierarchical level of user interaction, and individual detail panels or detail cards may be grasped, moved, rotated, scrolled, or released at a second nested or hierarchical level of user interaction. Further, various other functions, actions, or operations may be performed responsive to various other types of inputs or interactions described herein in the context of virtual reality environments, objects presented therein, and information associated with such objects.

In example embodiments, the various commands, inputs, or instructions described herein may be explicit commands or inputs related to manipulations, selections, or other actions associated with user interfaces within a virtual reality environment. However, in other example embodiments, the various commands, inputs, or instructions described herein may be implied commands or inputs based on programming logic and/or various actions performed or initiated by a user or by an application within the virtual reality environment related to manipulations, selections, or other actions associated with user interfaces within the virtual reality environment.

Although the example embodiments are described herein in the context of virtual reality environments and virtual reality objects, in other example embodiments, the systems, methods, and processes described herein may be implemented in other environments having corresponding objects, such as augmented reality environments and augmented reality objects, mixed reality environments and mixed reality objects, extended reality environments and extended reality objects, or other similar environments and objects. For example, mixed reality environments or extended reality environments may comprise various combinations of augmented reality environments and objects and virtual reality environments and objects. Further, the various processes, functions, and operations described herein may be performed and executed by various types of virtual reality, augmented reality, and/or extended reality systems and devices, including Oculus systems and devices by Facebook®, Hololens systems and devices by Microsoft®, virtual reality systems and devices by Intel®, Daydream systems and devices by Google®, and other related or similar systems and devices.

Further, although the example embodiments described herein are generally related to manipulations and/or interactions of a single user within a virtual reality environment, in other example embodiments, a plurality of users may manipulate and/or interact with user interfaces and virtual reality objects concurrently as described herein within a virtual reality environment. For example, multiple users may be viewing, manipulating, and/or interacting concurrently with user interfaces and various objects within the same virtual reality environment. Each of the multiple users may manipulate and/or interact with user interfaces and various objects within the virtual reality environment independently from each other. In addition, the multiple users may hand off manipulation and/or interaction with user interfaces and objects between themselves. Further, the multiple users may communicate with each other within the environment, such as via audio communications using microphones and speakers and/or visual communications using gestures, motions, pointers, or other visual indications. Moreover, each of the multiple users may be presented with selectable menu options, selection elements, and/or other user interface elements independently from other users. However, various operations associated with such selectable menu options, selection elements, and/or other user interface elements may affect aspects of the environment as a whole, including other users within the environment, such that multiple users within the environment may interact collaboratively in the environment that is shared and viewable by the multiple users.

In further example embodiments, one of the multiple users within the same virtual reality environment may be designated as a primary user, and the primary user may have relatively more control over various interactions within the environment. For example, user interfaces as described herein may be presented or displayed for viewing by the primary user, e.g., positioned or oriented toward a user position of the primary user within the environment. Other secondary users within the environment may therefore need to modify their positions within the environment in order to view such user interfaces that are positioned or oriented toward the position of the primary user. This directed presentation toward the primary user may facilitate collaborative discussion and interaction between the multiple users within the environment, such that visual communications using gestures, motions, or pointers, as well as audio communications, may be understood by the multiple users with reference to a common reference point, i.e., the user interfaces positioned or oriented toward the primary user. In addition, various operations associated with selectable menu options, selection elements, and/or other user interface elements may require confirmation or acceptance by the primary user before modifying aspects of the environment as a whole, including for other users within the environment, such that multiple users within the environment may interact collaboratively in the environment that is shared and viewable by the multiple users, while still allowing primary control over changes and modifications by the primary user. Moreover, the designation of the primary user among multiple users within an environment may be transferred between the multiple users as desired.

In other example embodiments, one or more of the multiple users may view, manipulate, and/or interact with the environment using various computing devices that present visual data as two-dimensional visual data, instead of three-dimensional visual data, models, and objects of virtual reality environments. For example, some of the multiple users may view the environment using desktop computers, laptop computers, tablet computers, mobile computing devices, or other computing devices that may include two-dimensional display devices, audio input devices, audio output devices, and/or other input/output devices such as a keyboard, mouse, trackpad, stylus, pointer, touch-sensitive input device or surface, or other devices. Using such example computing devices, some of the multiple users, such as secondary users, may view and/or interact with two-dimensional visual data of the environment from various viewpoints. For example, a secondary user may view and/or interact with the environment from a viewpoint of the user, or primary user, interacting within the virtual reality environment using a headset, goggles, other wearable computing device, etc. In addition, a secondary user may view and/or interact with the environment from a viewpoint of one or more fixed or stationary viewpoints or cameras placed within the environment, e.g., an overhead view, a view from an elevated corner of the room, a view from a center of a wall of the room, or other views. Further, a secondary user may be able to pan, zoom, rotate, or otherwise modify such views from various viewpoints or cameras, as well as switch or move between views from various viewpoints or cameras. Moreover, a secondary user may view and/or interact with the environment from one or more viewpoints that may be stored and transmitted to the secondary user for viewing, e.g., based on a selection by the primary user.

In accordance with the example embodiments described herein, a plurality of users may efficiently and intuitively communicate and collaborate with each other within a virtual reality environment. In addition, a plurality of users within a virtual reality environment may simply and intuitively manipulate and/or interact with user interfaces, virtual reality objects, and/or other aspects of the virtual reality environments concurrently within the same virtual reality environment.

Figure 10:
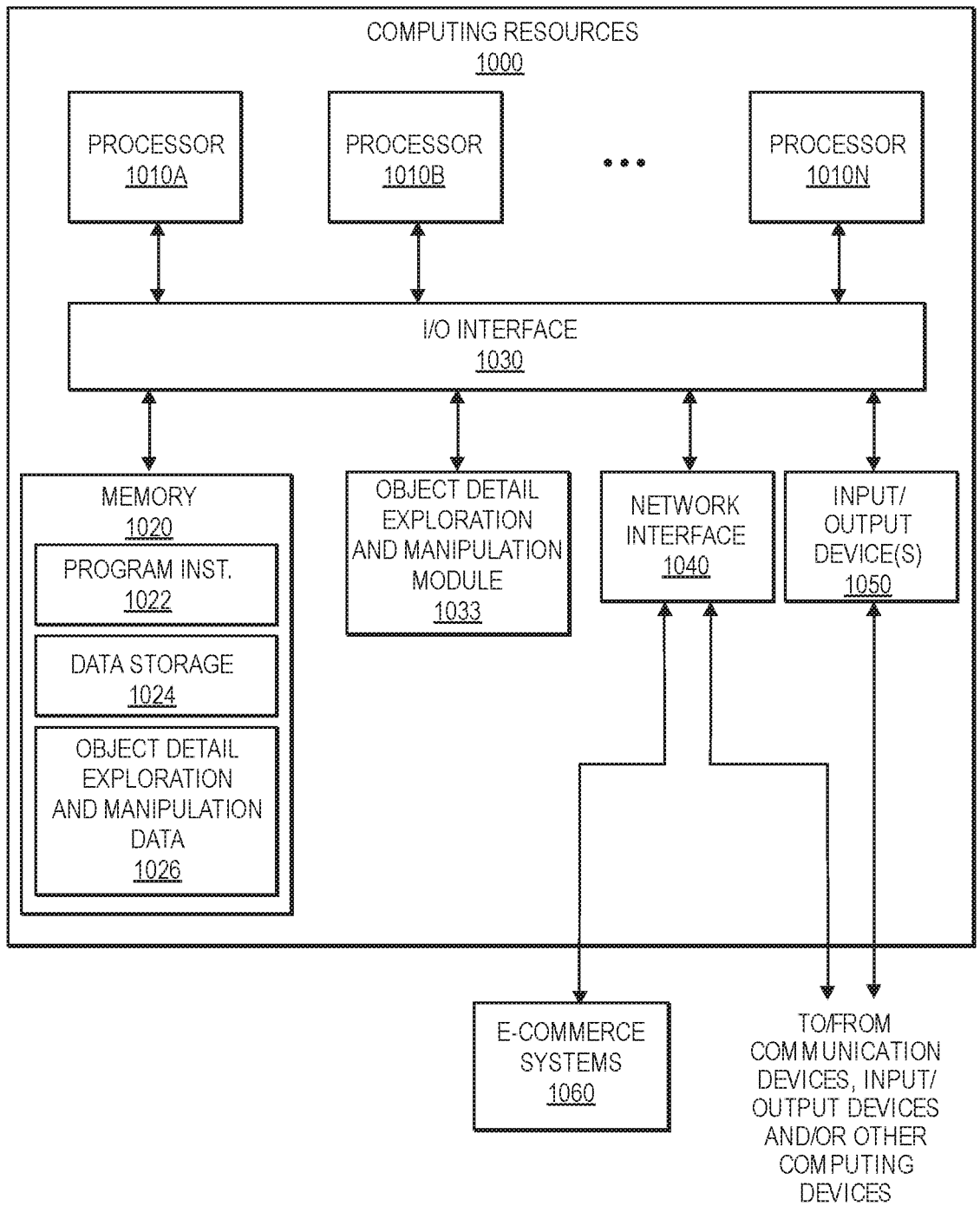
FIG. 10 is a block diagram illustrating various components of example computing resources associated with object exploration and manipulation within virtual reality environments, in accordance with implementations of the present disclosure.

FIG. 10 is a block diagram illustrating various components of example computing resources 1000 associated with object exploration and manipulation within virtual reality environments, in accordance with implementations of the present disclosure.

In various examples, the block diagram may be illustrative of one or more aspects of computing resources 1000 that may be used to implement the various systems and processes discussed above. In the illustrated implementation, the computing resources 1000 may include one or more processors 1010, coupled to a non-transitory computer readable storage medium 1020 via an input/output (I/O) interface 1030. The computing resources 1000 may also include an object detail exploration and manipulation module 1033, a network interface 1040, and one or more input/output devices 1050.

The computing resources 1000 may be included as part of a computing device or system, a display device or system, a virtual reality computing device or system, a smart or connected home device or system, other input/output devices or systems, and/or other computing systems, or combinations thereof. In various implementations, the computing resources 1000 may be a uniprocessor system including one processor 1010, or a multiprocessor system including several processors 1010A-1010N (e.g., two, four, eight, or another suitable number). The processor(s) 1010 may be any suitable processor capable of executing instructions. For example, in various implementations, the processor(s) 1010 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1010 may commonly, but not necessarily, implement the same ISA.

The non-transitory computer readable storage medium 1020 may be configured to store executable instructions, data, virtual reality environment data, virtual reality device and/or controller data, hover card data, detail card data, detail page data, detail panel data, furniture, furnishing, fixture, and object data, two-dimensional image or object data, three-dimensional model or object data, functions, commands, actions, or instructions data, inputs or selections data, user and user account data, and/or any other data items accessible by the processor(s) 1010. In various implementations, the non-transitory computer readable storage medium 1020 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 1020 as program instructions 1022, data storage 1024 and object detail exploration and manipulation data 1026, respectively. In other implementations, program instructions, data and/or object detail exploration and manipulation data may be received, sent or stored upon different types of computer-accessible media, such as non-transitory media, or on similar media separate from the non-transitory computer readable storage medium 1020 or the computing resources 1000.

Generally speaking, a non-transitory, computer readable storage medium may include storage media or memory media such as magnetic or optical media, e.g., disk or CD/DVD-ROM, coupled to the computing resources 1000 via the I/O interface 1030. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 1040.

In one implementation, the I/O interface 1030 may be configured to coordinate I/O traffic between the processor(s) 1010, the non-transitory computer readable storage medium 1020, and any peripheral devices, the network interface 1040 or other peripheral interfaces, such as input/output devices 1050. In some implementations, the I/O interface 1030 may perform any necessary protocol, timing or other data transformations to convert data signals from one component (e.g., non-transitory computer readable storage medium 1020) into a format suitable for use by another component (e.g., processor(s) 1010). In some implementations, the I/O interface 1030 may include support for devices attached through various types of peripheral buses, such as a variant of the Peripheral Component Interconnect (PCI) bus standard or the Universal Serial Bus (USB) standard, for example. In some implementations, the function of the I/O interface 1030 may be split into two or more separate components, such as a north bridge and a south bridge, for example. Also, in some implementations, some or all of the functionality of the I/O interface 1030, such as an interface to the non-transitory computer readable storage medium 1020, may be incorporated directly into the processor(s) 1010.

The object detail exploration and manipulation module 1033, potentially in combination with one or more processors 1010, may perform the various processes, functions, and operations described herein with respect to virtual reality environments, virtual reality objects, hover cards, detail cards, detail pages, detail panels, user interactions with or manipulations of virtual reality objects, hover cards, detail cards, detail pages, and/or detail panels, and/or other aspects of virtual reality environments described herein.

The network interface 1040 may be configured to allow data to be exchanged between the computing resources 1000, other devices attached to a network, such as other computer systems, display devices, virtual reality devices, connected devices, smart home devices, audio/video systems or devices, social media systems or devices, search systems, sensors, other input/output elements, e-commerce computing systems 1060 including one or more object, product, and/or item catalog systems, purchase, lease, rent, and/or acquisition systems, and associated shipping and/or distribution systems, and/or other computing resources. For example, the network interface 1040 may enable wireless communication between the computing resources 1000 and one or more virtual reality devices and/or display or presentation devices that present virtual reality environments, objects, and/or user interfaces. In various implementations, the network interface 1040 may support communication via wireless general data networks, such as a Wi-Fi network. For example, the network interface 1040 may support communication via telecommunications networks such as cellular communication networks, satellite networks, and the like.

Input/output devices 1050 may, in some implementations, include one or more visual output devices, audio input/output devices, virtual reality devices and/or peripherals, headsets, goggles, wearable devices, controllers, joysticks, connected devices, smart home devices, input devices such as touchscreens, keyboards, mice, or remote controllers, image capture devices, audio sensors, temperature sensors, other sensors described herein, etc. Multiple input/output devices 1050 may be present and controlled by the computing resources 1000.

As shown in FIG. 10, the memory may include program instructions 1022 which may be configured to implement the example processes and/or sub-processes described above. The data storage 1024 and object detail exploration and manipulation data 1026 may include various data stores for maintaining data items that may be provided for presentation, modification, interaction, and/or manipulation of virtual reality environments, virtual reality objects, hover cards, detail cards, detail pages, and/or detail panels, as well as any other functions, operations, interactions, manipulations, or processes described herein.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Each process described herein may be implemented by the architectures described herein or by other architectures. The processes are illustrated as a collection of blocks in a logical flow. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the processes. Additionally, one or more of the operations may be considered optional and/or not utilized with other operations.

Those skilled in the art will appreciate that the computing resources 1000 are merely illustrative and are not intended to limit the scope of the present disclosure. In particular, the computing systems and devices may include any combination of hardware or software that can perform the indicated functions, including computers, network devices, internet appliances, PDAs, wireless phones, etc. The computing resources 1000 may also be connected to other devices that are not illustrated, or instead may operate as stand-alone systems. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the computing resources 1000. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the computing resources 1000 may be transmitted to the computing resources 1000 via transmission media or signals, such as electrical, electromagnetic, or digital signals, conveyed via a communication medium, such as a network and/or a wireless link. Various implementations may further include receiving, sending or storing instructions and/or data implemented in accordance with the foregoing description upon a computer-accessible medium. Accordingly, the techniques described herein may be practiced with other computing resource configurations.

Those skilled in the art will appreciate that, in some implementations, the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various processes and systems as illustrated in the figures and described herein represent example implementations. The processes and systems may be implemented in software, hardware, or a combination thereof in other implementations. Similarly, the order of any process may be changed, and various elements may be added, reordered, combined, omitted, modified, etc., in other implementations.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, virtual reality, mixed reality, extended reality, and/or augmented reality systems and processes should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 8A-9B, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method to present user interfaces in an extended reality environment, comprising:
   receiving, via an input device, a first input associated with an object presented within an extended reality environment, the first input comprising a hover indication over the object;
   causing, via a display device, presentation of a first user interface associated with the object responsive to the first input, the first user interface comprising a hover card including at least one additional detail associated with the object overlaid onto a presentation of the extended reality environment;
   receiving, via the input device, a second input associated with the object presented within the extended reality environment, the second input comprising a selection input associated with the object;
   causing, via the display device, presentation of a second user interface associated with the object responsive to the second input, the second user interface comprising a detail card including additional details and selectable options associated with the object overlaid onto the presentation of the extended reality environment;
   receiving, via the input device and during the presentation of the second user interface, a third input associated with the object presented within the extended reality environment, the third input comprising a second hover indication over the object;
   causing, via the display device, presentation of a third user interface associated with the object responsive to the third input, the third user interface comprising a second hover card including object variations associated with the object overlaid onto the presentation of the extended reality environment, the third user interface being presented together with the second user interface;
   receiving, via the input device, a fourth input associated with the object presented within the extended reality environment, the fourth input comprising a selection of a full details selectable option; and
   causing, via the display device, presentation of a fourth user interface associated with the object responsive to the fourth input, the fourth user interface comprising a detail page including additional details presented via a plurality of columns of detail panels overlaid onto the presentation of the extended reality environment;
   wherein the plurality of columns of detail panels are movable and scrollable by a user via the input device;
   wherein individual columns of the plurality of columns of detail panels are movable and scrollable by the user via the input device; and
   wherein individual detail panels of the plurality of columns of detail panels are at least one of graspable, movable, or scrollable by the user via the input device.

2. The computer-implemented method of claim 1, wherein the at least one additional detail included in the hover card of the first user interface comprises a plurality of selectable variations associated with the object; and
   wherein the plurality of selectable variations included in the hover card of the first user interface are selectable by the user via the input device.

3. The computer-implemented method of claim 1, wherein the detail card of the second user interface is at least one of movable, scrollable, or graspable by the user via the input device.

4. The computer-implemented method of claim 1, wherein the object variations included in the second hover card of the third user interface are selectable by the user via the input device.

5. The computer-implemented method of claim 1, wherein the hover card is presented at a location above the object within the extended reality environment in the first user interface;
   wherein the detail card is presented proximate the object within the extended reality environment in the second user interface based at least in part on a field of view of the user;
   wherein the second hover card is presented at a location above the object within the extended reality environment in the third user interface; and wherein the detail page is presented as including the plurality of columns of detail panels within the extended reality environment in the fourth user interface within at least three zones associated with portions of the field of view of the user.

6. A computer-implemented method, comprising:
receiving, via an input device, an input associated with an object presented within an extended reality environment, the input comprising a selection of a full details selectable option; and
causing, via a display device, presentation of a user interface associated with the object responsive to the input, the user interface comprising a detail page including additional details presented via a plurality of detail panels overlaid onto a presentation of the extended reality environment;
wherein the plurality of detail panels comprises a plurality of columns of detail panels;
wherein individual columns of the plurality of columns of detail panels are movable and scrollable relative to each other by a user via the input device; and
wherein at least one detail panel of the plurality of detail panels is movable, scrollable, and graspable by the user via the input device.

7. The computer-implemented method of claim 6, wherein the user interface comprises at least three zones associated with portions of a field of view of the user, the at least three zones including a primary zone, a secondary zone, and a tertiary zone that are substantially centered within the field of view of the user.

8. The computer-implemented method of claim 7, wherein the primary zone includes a first width and a first height within the field of view of the user, the secondary zone includes a second width greater than the first width and a second height greater than the first height within the field of view of the user, and the tertiary zone includes a third width substantially similar to the second width and a third height greater than the second height within the field of view of the user.

9. The computer-implemented method of claim 6, wherein the plurality of columns are arranged substantially in a curve around a user position within the extended reality environment.

10. The computer-implemented method of claim 6, wherein the plurality of columns comprise respective columns of videos, object variations, object information, images, user reviews, manufacturer information, and recommendations associated with the object.

11. The computer-implemented method of claim 6, wherein the plurality of columns are at least one of movable or scrollable within a field of view of the user.

12. The computer-implemented method of claim 6, further comprising:
receiving, via the input device, an input associated with grasping the at least one detail panel; and
causing, via the display device, presentation of the at least one detail panel coupled to the input device.

13. The computer-implemented method of claim 12, further comprising:
receiving, via the input device, an input associated with moving the at least one detail panel; and
causing, via the display device, presentation of moving the at least one detail panel coupled to the input device.

14. The computer-implemented method of claim 12, further comprising:
receiving, via the input device, an input associated with scrolling within the at least one detail panel; and
causing, via the display device, presentation of scrolling within the at least one detail panel coupled to the input device.

15. The computer-implemented method of claim 12, further comprising:
receiving, via the input device, an input associated with releasing the at least one detail panel; and
causing, via the display device, presentation of release of the at least one detail panel and placement within the detail page.

16. The computer-implemented method of claim 6, further comprising:
receiving, via the input device, an input associated with at least one keyword within the plurality of detail panels of the detail page; and
causing, via the display device, modification of presentation of the at least one keyword within the plurality of detail panels of the detail page.

17. The computer-implemented method of claim 6, further comprising:
receiving, via the input device, a second input associated with the object presented within the extended reality environment, the second input comprising a hover indication over the object; and
causing, via the display device, presentation of a second user interface associated with the object responsive to the second input, the second user interface comprising a hover card including at least one additional detail associated with the object overlaid onto the presentation of the extended reality environment.

18. The computer-implemented method of claim 6, further comprising:
receiving, via the input device, a third input associated with the object presented within the extended reality environment, the third input comprising a selection input associated with the object; and
causing, via the display device, presentation of a third user interface associated with the object responsive to the third input, the third user interface comprising a detail card including additional details and selectable options associated with the object overlaid onto the presentation of the extended reality environment.

19. A system, comprising:
an input device;
a presentation device;
a processor communicatively coupled to the input device and the presentation device; and
a memory communicatively coupled to the processor, the memory storing program instructions that, when executed by the processor, cause the processor to at least:
present, via the presentation device, an extended reality environment;
receive, via the input device, an input associated with an object presented within the extended reality environment; and
present, via the presentation device and responsive to the input, a user interface associated with the object within the extended reality environment, wherein the user interface is configured to transition between different levels of information presentation, including a hover card, a detail card, and a detail page;
wherein the hover card is presented responsive to the input comprising a hover indication associated with the object, and the hover card includes at least one additional detail associated with the object;

wherein the detail card is presented responsive to the input comprising a selection input associated with the object, and the detail card includes a plurality of additional details and selectable options associated with the object; and wherein the detail page is presented responsive to the input comprising a selection of a full details selectable option associated with the object, and the detail page includes additional details presented via a plurality of columns of detail panels, individual columns of the plurality of columns of detail panels being movable and scrollable relative to each other by a user via the input device, and at least one detail panel of the plurality of columns of detail panels being manipulatable by the user via the input device.

20. The system of claim 19, wherein the plurality of columns of detail panels are movable and scrollable by the user via the input device; and wherein the at least one detail panel is graspable, movable, scrollable, and releasable by the user via the input device.

* * * * *